(12) United States Patent (10) Patent No.: US 9,100,944 B2
Newham et al. (45) Date of Patent: Aug. 4, 2015

(54) WIRELESS CONNECTING MOBILE DEVICES AND WEARABLE DEVICES

(71) Applicant: QUALCOMM Incorporated, San Diego, CA (US)

(72) Inventors: Adam Edward Newham, Poway, CA (US); Nikhil Jain, San Diego, CA (US); Rohit Sauhta, San Diego, CA (US); Praveen Kumar Yaramada, San Diego, CA (US); Karthik Chitireddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/153,676

(22) Filed: Jan. 13, 2014

(65) Prior Publication Data

US 2015/0065055 A1 Mar. 5, 2015

Related U.S. Application Data

(60) Provisional application No. 61/870,851, filed on Aug. 28, 2013.

(51) Int. Cl.
*H04W 4/00* (2009.01)
*H04W 76/02* (2009.01)
*H04W 52/02* (2009.01)

(52) U.S. Cl.
CPC ............ *H04W 76/023* (2013.01); *H04W 4/008* (2013.01); *H04W 52/0251* (2013.01)

(58) Field of Classification Search
USPC ........... 455/3.01, 3.02, 3.03, 3.04, 41.1, 41.2, 455/41.3, 63.1, 67.11, 550, 566, 567, 569.1, 455/575.1
See application file for complete search history.

(56) References Cited

U.S. PATENT DOCUMENTS 7,813,698 B2 * 10/2010 Seshadri et al. ............. 455/41.2
7,996,496 B2     8/2011 Haartsen et al.
(Continued)

FOREIGN PATENT DOCUMENTS

WO        02052793 A1    7/2002
WO     2012161927 A1   11/2012

OTHER PUBLICATIONS

Partial International Search Report—PCT/US2014/052194—ISA/EPO—Nov. 27, 2014.

(Continued)

*Primary Examiner* — Thanh Le
(74) *Attorney, Agent, or Firm* — The Marbury Law Group, PLLC

(57) ABSTRACT

The various aspects provide for wirelessly connecting mobile devices and wearable devices, which may enhance battery life and user experience. The embodiments may determine whether the mobile device is streaming audio data to a wirelessly connected peripheral audio device. Requests from the mobile device to wirelessly connect to the wearable device may be deferred while the mobile device is streaming audio data to the peripheral audio device using the same communication protocol as the wireless connection to be made between the mobile device and the wearable device. The mobile device may determine when streaming of audio data to the peripheral audio device has stopped. The mobile device may send a request to wirelessly connect to the wearable device when the mobile device is not streaming audio data to the peripheral audio device using the same communication protocol.

24 Claims, 15 Drawing Sheets

(56) References Cited

U.S. PATENT DOCUMENTS

| | | |
|---|---|---|
| 7,996,571 B2 | 8/2011 | Salokannel |
| 8,150,475 B2 | 4/2012 | Gilmore et al. |
| 8,320,832 B2 | 11/2012 | Kang et al. |
| 2002/0115478 A1* | 8/2002 | Fujisawa et al. ............. 455/567 |
| 2010/0240345 A1 | 9/2010 | Karrman et al. |
| 2011/0059769 A1 | 3/2011 | Brunolli |
| 2012/0044062 A1 | 2/2012 | Jersa et al. |
| 2012/0233644 A1 | 9/2012 | Rao |
| 2013/0182650 A1 | 7/2013 | Kezys et al. |
| 2013/0260672 A1 | 10/2013 | Patil et al. |
| 2014/0222526 A1* | 8/2014 | Shakil et al. ................ 705/7.38 |
| 2014/0379336 A1* | 12/2014 | Bhatnagar .................... 704/235 |

OTHER PUBLICATIONS

International Search Report and Written Opinion—PCT/US2014/052194—ISA/EPO—Mar. 12 2015.

* cited by examiner

WIRELESS CONNECTING MOBILE DEVICES AND WEARABLE DEVICES

RELATED APPLICATIONS

This application claims the benefit of priority to U.S. Provisional Application No. 61/870,851 entitled "Method And Apparatus To Implement A Hybrid Always-Connected And Connect-On-Demand For The Purpose Of Enhancing Battery Life And User Experience" filed Aug. 28, 2013, the entire contents of which are hereby incorporated by reference.

BACKGROUND

This application generally relates to the field of wireless connection and communication between a mobile device and a peripheral device, such as a wearable device. Peripheral devices using wireless technologies may be configured to maintain a wireless communication connection with a mobile device (e.g., a smart phone) either through establishing the connection on-demand or establishing an always-on connection. Problems can be encountered with maintaining or establishing such a wireless communication connection. For example, the user may move one of the mobile device or the wearable device such that they are no longer within communication range of each other. Also, signal interference or other factors may cause the connection to drop. Therefore, there may be a frequent need to reestablish the wireless communication link between the devices. However, conserving battery power is also an important design consideration in such mobile computing devices.

Establishing a wireless connection may also introduce problems with the quality of an existing connection between the mobile device and another peripheral device. When attempting to establish a connection, a device may employ a frequency scanning technique across the baseband for the connection technology. The scan may involve sending signals on multiple frequencies of the baseband in order to discover another device listening on a particular frequency. This multi-frequency scan may interfere with an existing connection using the same connection technology causing degradation in the quality of the existing connection and the transferred data.

SUMMARY

The various embodiments include devices, systems, and methods for establishing a wireless connection between a mobile device and a wearable device in a manner that may not substantially interfere with an ongoing wireless audio data stream to an audio device. In an embodiment, a method for a mobile device to wirelessly connect and communicate with a wearable device when the mobile device is also wirelessly connected to a peripheral audio device may include determining whether the mobile device is streaming audio data to the wirelessly connected peripheral audio device, deferring sending from the mobile device to the wearable device a request to wirelessly connect to the wearable device in response to determining that the mobile device is streaming audio data to the wirelessly connected peripheral audio device, determining whether the mobile device has stopped streaming audio data to the wirelessly connected peripheral audio device, and sending from the mobile device to the wearable device a request to wirelessly connect to the wearable device in response to determining that the mobile device has stopped streaming audio data to the wirelessly connected peripheral audio device.

In an embodiment, a mobile device may include a processor configured with processor-executable instructions to perform operations including determining whether the mobile device is streaming audio data to a wirelessly connected peripheral audio device, deferring sending from the mobile device to a wearable device a request to wirelessly connect to the wearable device in response to determining that the mobile device is streaming audio data to the wirelessly connected peripheral audio device, determining whether the mobile device has stopped streaming audio data to the wirelessly connected peripheral audio device, and sending from the mobile device to the wearable device a request to wirelessly connect to the wearable device in response to determining that the mobile device has stopped streaming audio data to the wirelessly connected peripheral audio device.

In an embodiment, a wearable device configured to wirelessly communicate with a mobile device may include a processor configured with processor-executable instructions to perform operations including receiving from the mobile device in the wearable device a request to wirelessly connect to the wearable device, establishing a first wireless connection with the mobile device, recognizing by the wearable device a termination of the first wireless connection by the mobile device, sending from the wearable device to the mobile device a second request to establish a second wireless connection in response to recognizing that the mobile device terminated the first wireless connection, and establishing by the wearable device the second wireless connection between the mobile device and the wearable device.

In an embodiment, a communication system may include a peripheral audio device configured to receive streaming audio data over a first wireless connection, a mobile device configured to transmit streaming audio data over the first wireless connection to the peripheral audio device, a wearable device configured to connect wirelessly to the mobile device over a second wireless connection. The mobile device may include a processor configured with processor-executable instructions to perform operations including determining whether the mobile device is streaming audio data to the wirelessly connected peripheral audio device, deferring sending from the mobile device to the wearable device a request to wirelessly connect to the wearable device in response to determining that the mobile device is streaming audio data to the wirelessly connected peripheral audio device, determining whether the mobile device has stopped streaming audio data to the wirelessly connected peripheral audio device, and sending from the mobile device to the wearable device a request to wirelessly connect to the wearable device in response to determining that the mobile device has stopped streaming audio data to the wirelessly connected peripheral audio device. A processor of the wearable device may be configured with processor-executable instructions to perform operations including receiving from the mobile device the request to wirelessly connect to the mobile device, and establishing the second wireless connection with the mobile device in response to receiving the request to wirelessly connect.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
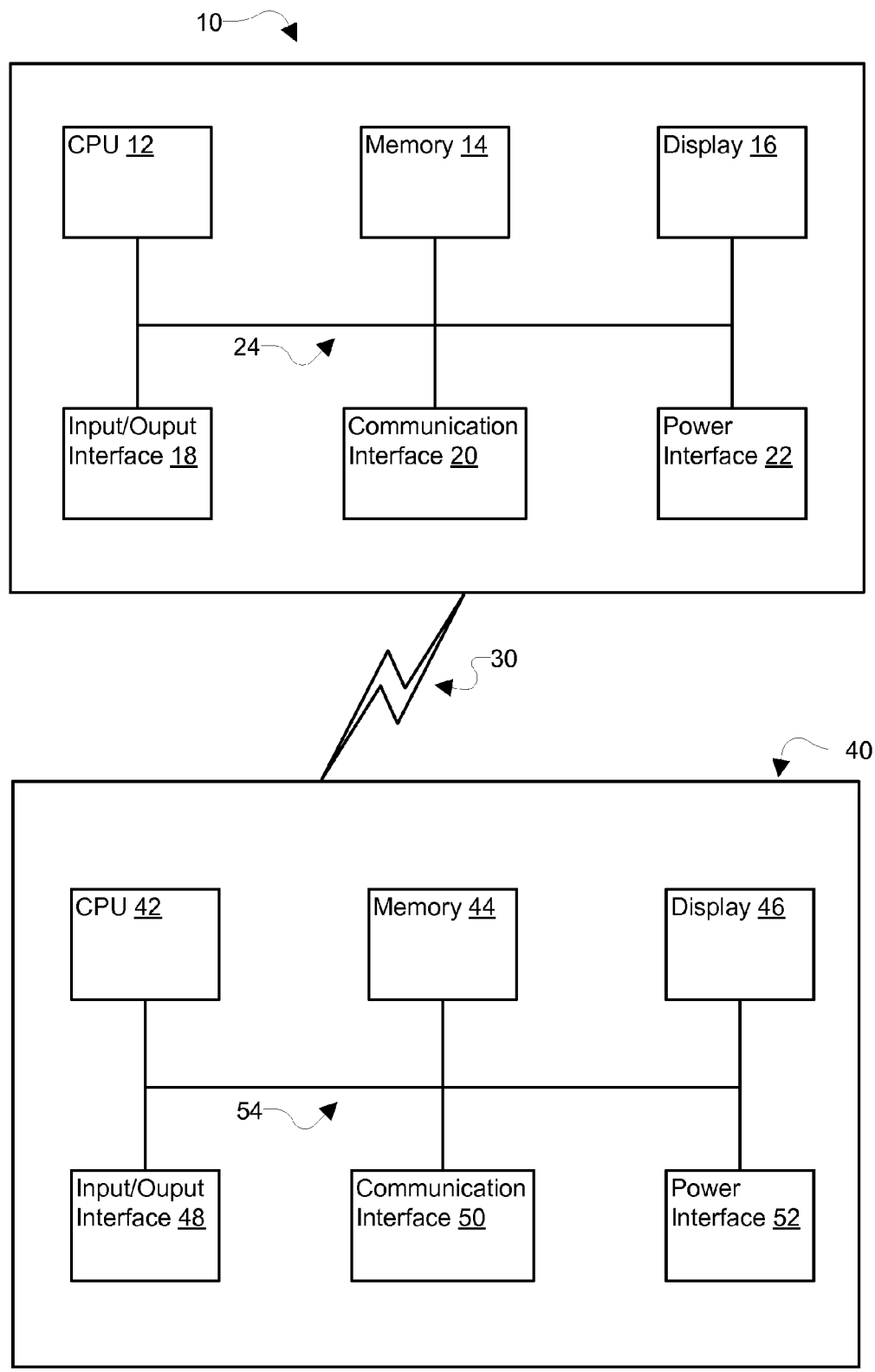
FIG. 1 is a component block diagram illustrating a system having a wearable device communicatively connected to a mobile device in accordance with an embodiment.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "mobile device" refers to any one or all of smart phones, laptop computers, personal computers, servers, tablet computers, palm-top computers, and similar electronic devices which individually include a programmable processor and memory and circuitry for sending signals between the components of the mobile device. Herein, the mobile device may be depicted as a smart phone; however, such drawings and references are meant to be exemplary and not limiting.

As used herein, the term "peripheral device" refers to any mobile device or a peripheral device of any mobile device. A peripheral device may be, for example, a standalone display, or an integrated display built into a structure, a furnishing, or a vehicle. The peripheral device may also be a "wearable device" that may be carried or worn by as user of the wearable device. Examples of wearable devices in the following descriptions and the drawings refer to a wearable device attached to a user's arm, specifically at the wrist like a watch. This example of a wearable device is meant to be exemplary and not limiting in any way. Other examples of wearable devices may be removably attached to or integrated into the user's clothing or accessories, worn around the user's neck (e.g., as on a cord or chain), or worn attached to the user's head, such as an earpiece, glasses-like frames, a headband, or a hat. The terms "peripheral device" and "wearable device" herein are used interchangeably.

Peripheral devices using wireless technologies, such as a smartwatch, may be configured to establish and/or maintain a wireless communication connection with a mobile device (such as a smart phone) either through establishing the connection on-demand or establishing an always-on connection. Problems can be encountered with maintaining or establishing such a wireless communication connection. For example, the user may move one of the mobile device or the wearable device such that they are no longer within communication range of each other. Also, signal interference or other factors may cause the connection to drop. Therefore, there may be a frequent need to reestablish the wireless communication link between the devices. However, conserving battery power is also an important design consideration in such mobile computing devices. Therefore, methods that enable establishing and/or maintaining the wireless communication link between such devices without draining a battery on either the mobile device or the wearable device, and making connection attempts without degrading the performance of either device (e.g., during a call on the mobile device) are desirable.

The wireless communication link between a mobile device and a wearable device may be implemented using a combination of always-on and on-demand connections. Upon initial start up, an application on the mobile device may attempt to connect to the wearable device. If the devices are within communication range of each other, this connection attempt should be successful. However, attempts to establish the communication link may be deferred to avoid disrupting Bluetooth baseband transmissions on an existing connection between the mobile device and another peripheral device, particularly an audio device such as an earpiece, such as during a phone call or media streaming. Disruption of Bluetooth transmissions during an audio stream may occur because the Bluetooth Service Discovery mechanism involves transmissions of connection request signals over several frequencies, which may interfere with an established Bluetooth connection and result in poor audio performance over that connection. For example, an attempt to connect the mobile device and the wearable device may be deferred until a phone call is completed or media streaming is completed, until there is a break in a phone call (e.g., if the call is placed on hold), or until there is a break in the media streaming, such as the pause between songs or a similar end of a media instance in a series of media instances.

The mobile device may attempt to establish a wireless communication link to the wearable device in response to certain events, such as the termination of a phone call, a user input received on a user interface, expiration of a timer, reception of a communication to be relayed to the wearable device, and other types of events. In an embodiment, while not already connected, each time the user interacts with a user interface of the wearable device, a set number of connection attempts may be made. In another embodiment, the mobile device may attempt to establish a wireless communication link with the wearable device each time a notification is to be sent from the mobile device to the wearable device. Nonlimiting examples of such notifications include receipt of an short messaging service message (SMS), multimedia messaging service message (MMS), instant message (IM), or email, user sending an SMS, MMS, IM or email, update of a call history, update of an address book, social media alerts, and a calendar pop-up. In any of these embodiments, the connection attempt by the mobile device to the wearable device may be deferred when a processor of the mobile device determines that attempting the connection may disrupt Bluetooth baseband transmissions on the existing connection between the peripheral device and the mobile device.

In various embodiments, the mobile device may implement various techniques for attempting to connect to the wearable device when the first connection attempt is not successful. In an embodiment a communication manager application may take into account whether the mobile device is available when determining whether to attempt to connect to the wearable device, such as when the mobile device is not actively on a call or streaming media (e.g., streaming audio, streaming video, or streaming audio and video). The communication manager application may attempt to connect the mobile device to the wearable device according to a criterion, such as a set number of times or repeatedly for a set time period. In the various embodiments, the number of attempts or the time period may be limited to prevent the battery of the mobile device from draining. Controlling the number of connection attempts by either the mobile device or the wearable device may help to minimize the battery drain from the Bluetooth Service Discovery processes. The communication manager application may also filter the attempts to avoid performing multiple attempts within a period of time, and thus avoid flooding the radio layer of the mobile device.

During Bluetooth baseband transmissions on the existing connection between the peripheral device and the mobile device, the mobile device may listen for connection attempts from the wearable device. Connection attempts from the wearable device are not as disruptive to the Bluetooth baseband as the connection attempts from the mobile device. This is partially because the Bluetooth Service Discovery mechanism performed on the mobile device may implement a channel scanning scheme transmitting and listening on multiple channels to find one channel that connects to the wearable device. When the mobile device scans the channels of the Bluetooth baseband, the scan may interfere with an existing active connection requiring high bandwidth, such as for transmission of audio or voice data, by reducing the amount of available bandwidth on the Bluetooth baseband. However, when the wearable device attempts to connect to the mobile device, the mobile device receives a request to connect on only one channel. For example, once an asynchronous connection-less link is established between the mobile device and the wearable device, the devices do not need to maintain a persistent connection. Asynchronous connection-less communications may be sent between the devices on predetermined frequencies, potentially prenegotiated by the devices, using connections lasting the duration of the communication. When the connection originates from the wearable device, the mobile device and the wearable device may establish a connection during Bluetooth baseband transmissions on the existing connection between the peripheral device and the mobile device without degrading the transmissions ongoing over the existing Bluetooth connection to the peripheral device.

If the mobile device fails to establish a wireless connection to the wearable device after the set number of attempts or set time period, the mobile device may suspend connection attempts and enter an idle mode. During the idle mode, the mobile device may listen for connection attempts from the wearable device, and thus rely on the wearable device to initiate the connection. In an embodiment, once the wireless communication link between the mobile device and the wearable device is established, that connection may be maintained using the Bluetooth SNIFF mode or a similar low duty cycle mode in order to enable the devices to operate in a low power state.

The above techniques and considerations for connecting the mobile device and the wearable device may also apply to reconnecting the devices after losing an existing connection. The wireless communication link between the mobile device and the wearable device may be dropped when the user moves one of the mobile device or the wearable device out of wireless communication range of each other, or when there is significant signal interference in the vicinity, such as from another transmitter. When the connection is dropped, the communication manager application may attempt to reestablish the connection for the set number of attempts or repeatedly for the set time period in order to maintain the always-on mode.

FIG. 1 illustrates a communication system including a wearable device 10 communicatively connected to a mobile device 40 suitable for use with an embodiment. The wearable device 10 and the mobile device 40 may include, a processor 12, 42, a memory 14, 44, a display 16, 46, an input/output interface 18, 48, a communication interface 20, 50, a power interface 22, 52, and a communication circuitry 24, 54, to pass signals between the other components. The processor 12, 42, may be any type of general purpose processors, such as a central processing unit (CPU) or microprocessor, specialized processor, such as a graphics processing unit (GPU), physics processing unit (GPU), accelerated processing unit (APU), digital signal processor (DSP) or microcontroller, or any other programmable logic circuit. The processor 12, 42, may also be configured as an integrated circuit (IC) or system-on-chip (SoC). The processor may be configured to execute processor instructions stored on the memory 14, 44, such as processor instructions embodying the process and determination blocks in FIGS. 4A-4E, FIGS. 5A-5D, FIGS. 6A and 6B, and FIGS. 7A and 7B, described further herein.

The memory or storage unit 14, 44, may be or include any of a wide array of volatile and non-volatile types of memory. In an embodiment the wearable device 10 and the mobile device 40 may include one or more of various types of a random access memory (RAM), a read only memory (ROM), a flash memory, and a hard disk drive (HDD). Other types of memory may include magnetic, optical, or hybrid memory devices. The memory may be configured to store processor instructions embodying the embodiment methods illustrated in FIGS. 4A-4E, FIGS. 5A-5D, FIGS. 6A and 6B, and FIGS. 7A and 7B, and described below.

The display 16, 46, may be a video, an audio, or a haptic component for presenting a visual, an audible, or a tactile output of the wearable device 10 and the mobile device 40. Some examples of the display 16, 46, may include a liquid crystal display (LCD) screen, an organic light emitting diode (OLED) screen, and an active matrix OLED (AMOLED) screen. Such displays 16, 46, may include resistive, capacitive, infrared, and/or optical imaging touch screen capabilities. Other examples may include a speaker, a vibration motor, and a haptic enabled screen.

The input/output interface 18, 48, may receive signals provided by the user or the surrounding of the wearable device 10 and the mobile device 40. Examples may include, a button, a key, a switch, a touch sensitive surface, a microphone, and a sensor, which may sense one or more of a variety of inputs, such as light, sound, temperature, position, movement, atmospheric pressure, and electromagnetic radiation.

The communication interface 20, 50, may include a combination of items configured to enable the wearable device 10 and the mobile device 40 to communicate over a network connection 30. Such items may include a radio frequency (RF) transceiver, an antenna, and a modem. The communication interface 20, 50, may be used with the other components of the wearable device 10 and the mobile device 40 to implement various wired and/or wireless transmission protocol stacks and interfaces.

The power interface 22, 52, may include components to connect to a power source (not shown) external to the wearable device 10 and the mobile device 40. The power interface 22, 52, may allow for wired and/or wireless transmission of power from the power source to the wearable device 10 and the mobile device 40 for charging a battery of the wearable device 10 (see FIG. 8) and the mobile device 40 (see FIG. 9).

The power may also be used to power the wearable device 10 and the mobile device 40 while connected to the power source.

The network connection 30 may allow for wired and/or wireless connection and communication between the wearable device 10 and the mobile device 40. The network connection 30 may be implemented via a wired or wireless a personal area network (PAN) or local area network (LAN). The network connection 30 may be implemented by a variety of communication protocols, for example, Bluetooth, WiFi, Peanut, ZigBee, and wired serial communications.

Figure 2:
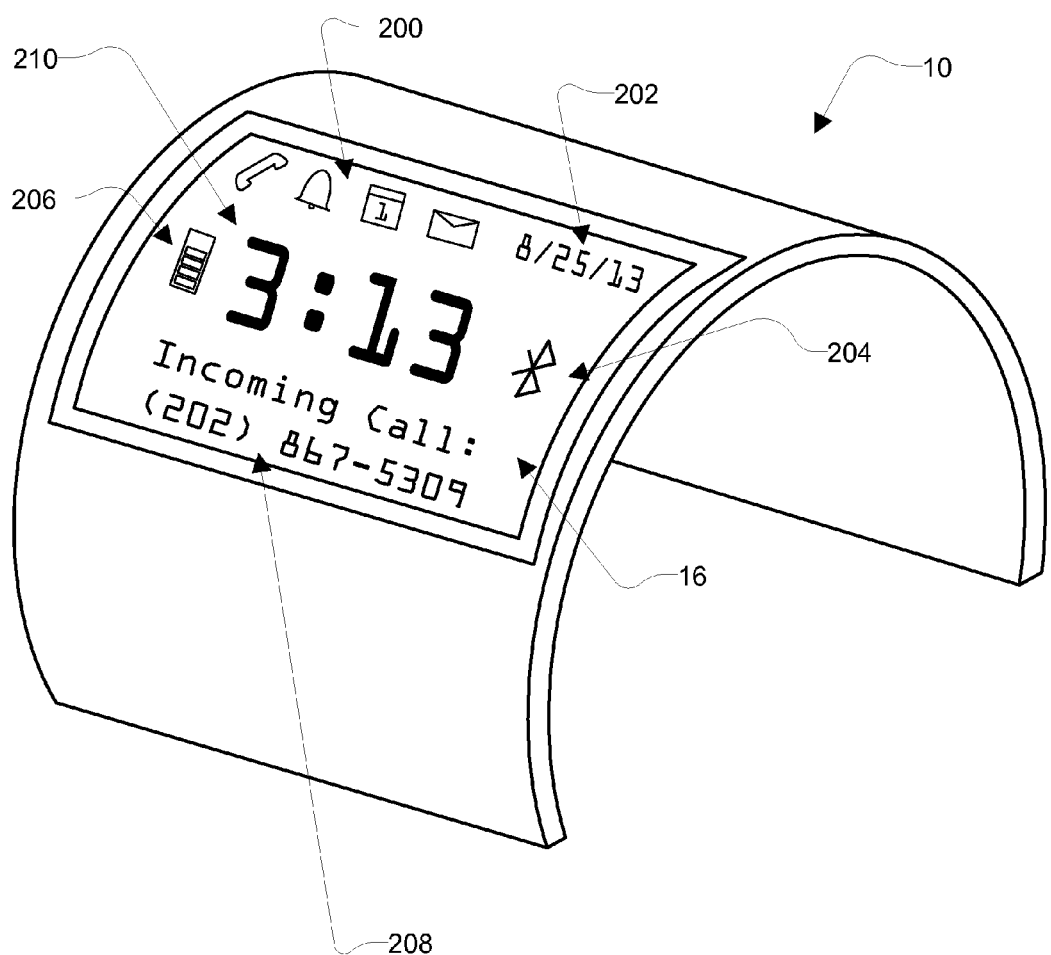
FIG. 2 is a perspective view of an exemplary wearable device suitable for use in accordance with an embodiment.

FIG. 2 illustrates an exemplary wearable device 10 suitable for use with an embodiment. In this example, the wearable device is a wrist cuff display, or smart watch. The wearable device 10 may include a display 16, which in this example is a visual display that may have touch screen capabilities. The display 16 may support configurable or non-configurable views that may allow a user to select the items that may be presented on the display 16, and where, when, and how the items may be displayed. Examples of the items the display 16 may present to the user include one or more indicators and/or icons 200 which may represent a variety of information. This information may include information about the mobile device 40, such as information regarding the current or previous phone call, message information, calendar information, and other assorted information. The phone call information may include indications about incoming calls, outgoing calls, and missed calls, as well as the status and number of such calls. The message information may include indications about SMS messages, MMS messages, IMs, emails, and voicemails, such as the status and number of such messages. The calendar information may include indications about appointments, tasks, reminders, and events, such as the status and number of each. The assorted information may include indications about alarms, application updates, and mobile device feature notifications, such as the status and number of each.

Other items on the display 16 may include a date 202 in various formats, a connection indicator 204 for showing the status of the network connection and/or strength of the network connection, and a battery level and/or network connection strength indicator 206 that may indicate the battery level of the wearable device 10 and/or the mobile device 40. The display 16 may present other types of information, such as text 208 that may be indicative of information relating the icons 200, the connection indicator 204, and/or the battery level and/or network connection strength indicator 206. Such text 208 may also indicate the status of a function of the wearable device 10 unrelated to the mobile device 40. The display 16 may also include one or more date and/or time displays 210 in various formats.

The items on the display 16 may be presented to the user and may notify the user of a change in the information the items represent by animating, blinking, illuminating, changing color, or other modification of the items on the display 16. The wearable device 10 may also, in conjunction or separately from modifying the items on the display 16, present the user with a sound or tactile sensation to alert the user to or inform the user of information relating the items of the display 16, or a function of the wearable device 10 unrelated to the mobile device 40.

Figure 3:
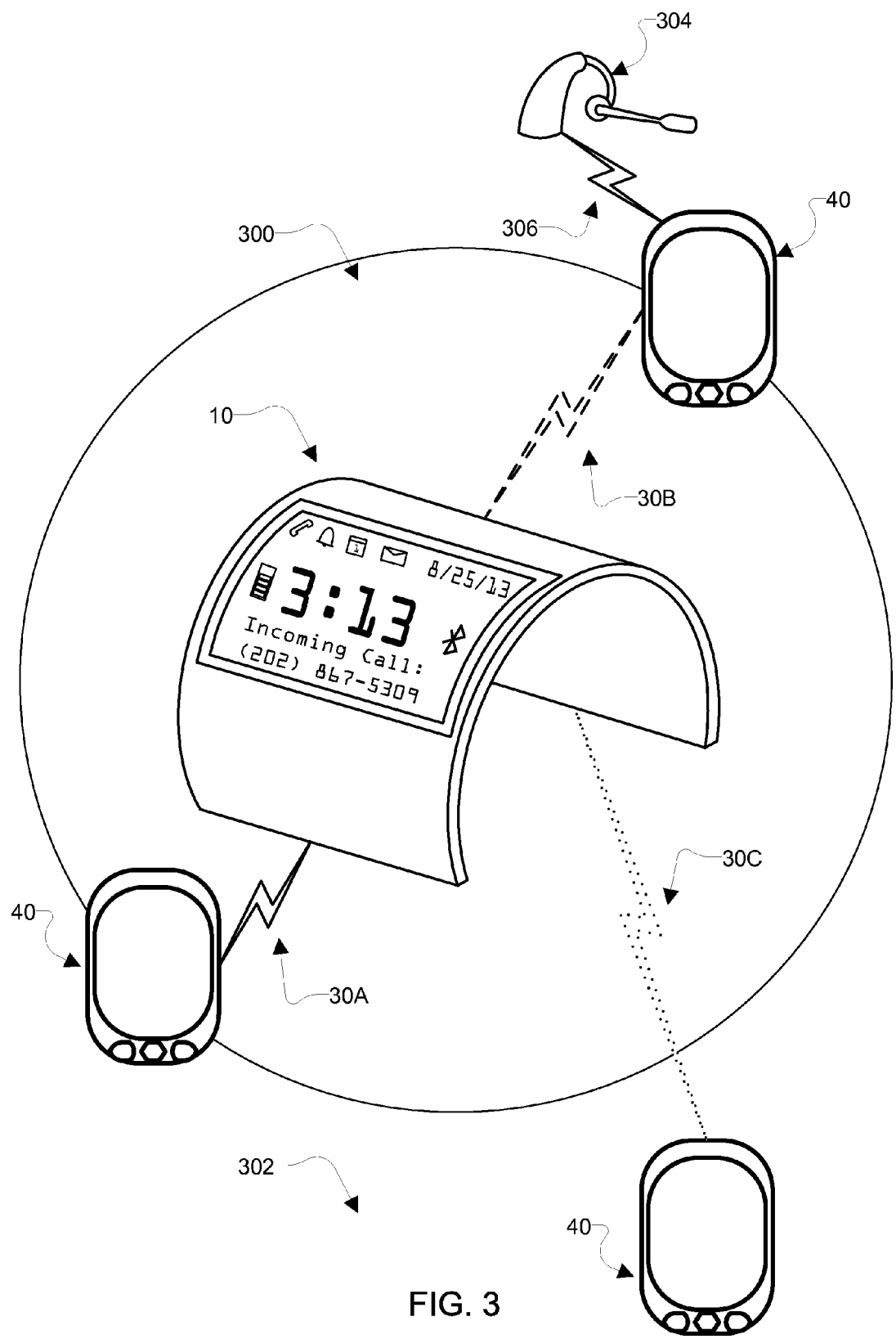
FIG. 3 is a communication block diagram illustrating various connections of a communication system including a wearable device communicatively connected to a mobile device in accordance with an embodiment.

FIG. 3 illustrates various network connections 30A-30C of a system including the wearable device 10 communicatively connected to the mobile device 40 in accordance with an embodiment. Area 300 illustrates an overlapping communication reception range of the wearable device 10 and the mobile device 40 within which the devices may successfully establish a wireless communication link. The area 302 illustrates ranges at which the wearable device 10 and the mobile device 40 cannot establish a wireless communication link. When the mobile device 40 is located within area 300, network connection 30A and 30B may be successfully established and maintained between the wearable device 10 and the mobile device 40.

The network connection 30B illustrates attempts to establish a wireless network connection 30B between the wearable device 10 and the mobile device 40. As mentioned above, a wireless network connection 30B may be lost or difficult to establish between the wearable device 10 and the mobile device 40 when there is radiofrequency interference or other signal-degrading circumstances. The wireless network connection 30B may also be difficult to establish or maintain when the signal is weak because the mobile device 40 is using another service of the same wireless transceiver at the same time. For example, the mobile device 40 may be connected and communicating with another wireless peripheral device 304 over the wireless network connection 306. The wireless peripheral device 304 (such as wireless headphones, a wireless earpiece, wireless speakers, a wireless visual display, or a wireless projector) may be capable of presenting media streamed from the mobile device 40 or transfer call data between itself and the mobile device 40. Streaming media or transferring call data over a wireless network connection 306 may be services that use the same wireless transceiver as the wireless network connection 30B.

When the mobile device 40 is actively connected to the wireless peripheral device 304, such as while streaming media to or transferring call data between itself and the wireless peripheral device 304, the mobile device 40 may not make a network connection attempt or maintain the wireless network connection 30B with the wearable device 10. While the wireless peripheral device 304 is shown as located within area 302, the location of the wireless peripheral device 304 may be irrelevant. Any communication to be sent from the mobile device 40 to the wearable device 10 may be postponed until the next time a network connection 30B connection attempt is successfully made.

A network connection 30B connection attempt from the wearable device 10 to the mobile device 40 may also fail because the mobile device 40 is using another service of the same wireless protocol at the same time and does not receive a request to connect from the wearable device 10. A network connection 30B connection attempt from the wearable device 10 to the mobile device 40 may also fail because the mobile device 40 is using another service of the same wireless protocol at the same time and does not send a request to connect to the wearable device 10.

When the mobile device 40 is located beyond communication range (i.e., within area 302), it may not be possible to establish a wireless network connection 30C between the wearable device 10 and the mobile device 40.

Figure 4A:
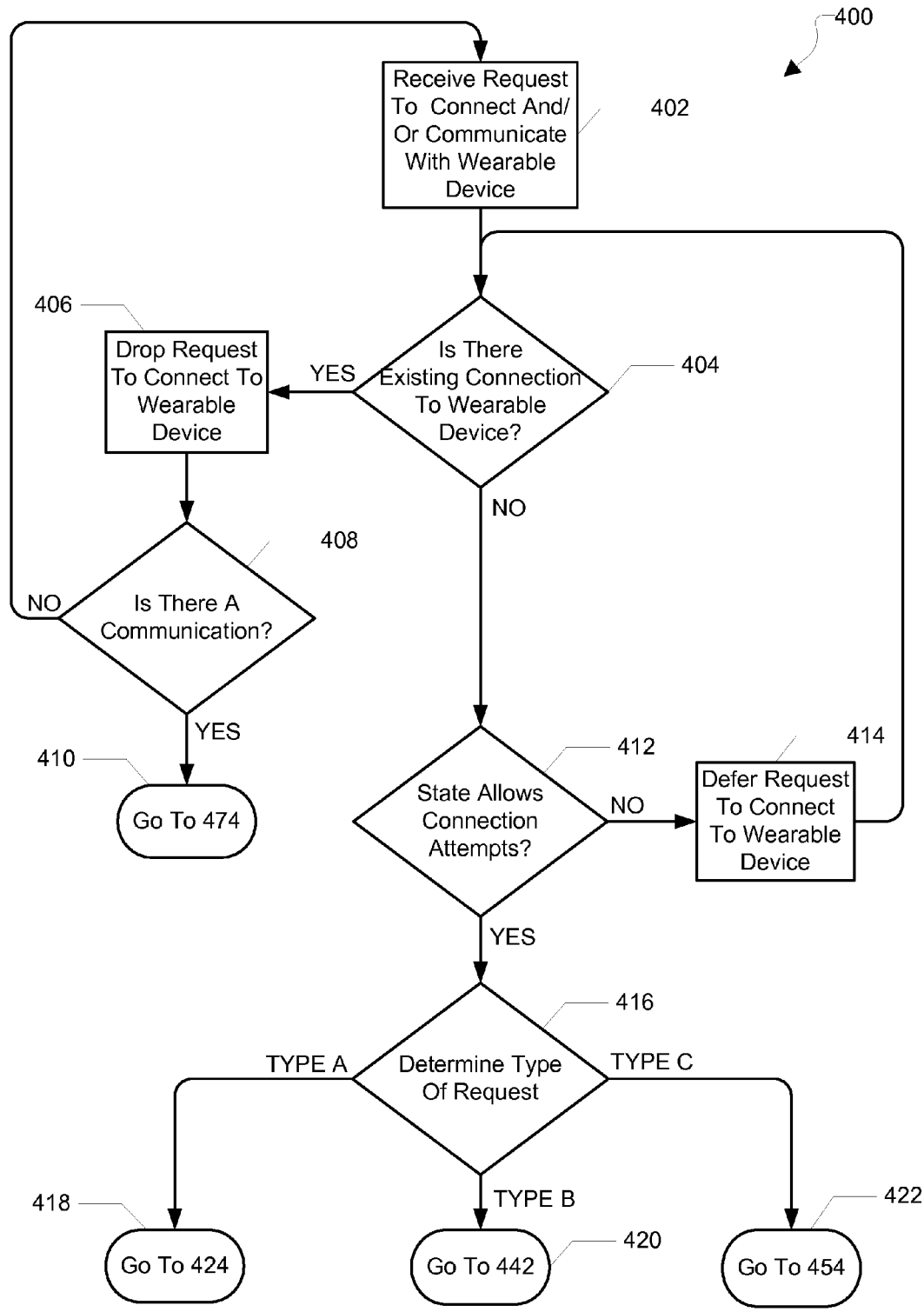
FIGS. 4A-4E are process flow diagrams illustrating an embodiment method for establishing a communication link between the mobile device and the wearable device.

FIGS. 4A-4E illustrate an embodiment method 400 between the mobile device and the wearable device. The process and determination blocks described herein may be embodied in processor-executable instructions that may be stored in the memory and executed by the processor of the mobile device. Referring to FIG. 4A, in block 402 the mobile device may receive a request to connect to and/or communicate with the wearable device. This request may be prompted by a prompt generated by a function or the user of the mobile device. For example, the mobile device may execute a mobile device process causing or in response to detecting an event that results in generating a communication having information to be sent to the wearable device, such as receiving an SMS message, issuing a calendar event notice, and issuing a missed call notice. Other mobile device processes may be any process causing or in response to detecting an event resulting in generating a communication having information related to the items of the display of the wearable device described herein. The requests may be of different types some examples of which are described herein. In an embodiment the request may include an indication to the wearable device that the mobile device is available or unavailable for a new connection or a communication. In an embodiment, the request to connect and/or communicate may originate from the wearable device and be received by the mobile device.

In determination block 404 the mobile device may determine whether there is an existing connection between the mobile device and the wearable device. When there is an existing connection (i.e. determination block 404="Yes"), the mobile device may drop the request for connection to the wearable device in block 406. In some embodiments there may not be a request to connect to the wearable device and only a request to communicate the generated communication with the wearable device. In such instances, the mobile device may skip block 406, or block 406 may be implemented without result when the mobile device is configured to properly handle such situations. In determination block 408 the mobile device may determine whether there is a request for communication. When there is not a request for communication (i.e. determination block 408="No"), the mobile device may return to block 402. When there is a request for communication (i.e. determination block 408="Yes"), in block 410 the mobile device may continue to block 474 (see FIG. 4E).

When there is not an existing connection (i.e. determination block 404="No"), the mobile device may determine whether the mobile device is in a state indicating that the mobile device is available to connect to and/or communicate with the wearable device in determination block 412. The state of the mobile device indicating whether the mobile device is available or unavailable for connection and/or communication may depend on the services active on the mobile device. For example, the mobile device may be unavailable to connect and/or communicate with the wearable device when the mobile device is streaming audio data to the wirelessly connected peripheral device, such as over a Bluetooth connection. For example, the mobile device may be streaming audio data to an audio peripheral device during on a phone call or while streaming audio media (e.g., music or a sound track of a movie) that is being played on the peripheral device. Thus, the mobile device may determine whether the mobile device is streaming audio data to the wirelessly connected peripheral device, and particularly whether the audio data is being streamed over a Bluetooth connection. The mobile device may be available to connect and/or communicate with the wearable device when the mobile device is not on a phone call or not streaming media, or when these services are inactive or idle. The unavailable mobile device may become available when the Bluetooth connection with the peripheral device ends or enters the low duty cycle mode when audio data streaming ends, such as when the phone call ends, the phone call is put on hold and no other phone call is active, or when there is a break in the streaming media, such as between instances of the streaming media (e.g. at the end of a song or video and before the beginning of the next song or video). Thus, the mobile device may determine whether the mobile device has stopped streaming audio data to the wirelessly connected peripheral device, and may determine whether streaming the audio data has stopped because the Bluetooth connection has ended or entered the low duty cycle mode. In an embodiment, when the mobile device converts between an available state and an unavailable state, the mobile device may generate information to notify the wearable device of the mobile device's state. In an embodiment, the time between events during which the mobile device is available, such as between instances of streaming media, is shorter than the time it may take to connect to the wearable device. To mitigate the impacts on quality from interference due to the process of connecting the devices, a fader may be implemented to gradually increase the volume of the event, keeping the volume lower while the quality of the event is low, and raising the volume as it improves. The determination as to when to increase the volume may be based on time, signal strength/quality, quality of the event, and/or the state of the connecting processes.

In an embodiment, the state of the mobile device depending on the active services of the mobile device may aid in avoiding interruption or degradation of the active services. For example, Bluetooth service may be active on the mobile device when on a phone call or when streaming media. The mobile device may use Bluetooth services to connect and communicate data to a Bluetooth enabled peripheral device, which may output the phone call or the media to a user. When the mobile device actively using Bluetooth service attempts to connect to another Bluetooth enabled device, the Bluetooth Service Discovery mechanism may cause interference on the Bluetooth baseband. The Bluetooth Service Discovery mechanism may send a page message on multiple frequencies to find the channel to which the wearable device is listening for connection requests. This may result in decreased quality in the phone call or media output of the already connected Bluetooth enabled peripheral device. Thus, the state of the mobile device may be unavailable until the Bluetooth service becomes inactive on the mobile device, and the mobile device switches states to available.

When the mobile device is unavailable to connect to and/or communicate with the wearable device (i.e. determination block 412="No"), the mobile device may defer sending or hold the request in block 414 until there is an existing connection between the mobile device and the wearable device or the mobile device becomes available. When the mobile device is available to connect to and/or communicate with the wearable device (i.e. determination block 412="Yes"), the mobile device may determine a type of the request to wirelessly connect to the wearable device in determination block 416. Communication requests may be categorized by type. One type of request to wirelessly connect to the wearable device may be a setup type request, referred to as a type A request. The setup type request may be prompted, for example, by a prompt generated by the mobile device powering up, enabling wireless communication capabilities (e.g. Bluetooth), pairing with the wearable device, disabling airplane mode, and completing an upgrade. Another type of request to wirelessly connect to the wearable device type may be a notification type request, referred to as a type B request. The notification type request may be prompted, for example, by a prompt generated by the mobile device issuing a calendar notification, a social media notification, an email notification, a messaging notification (e.g. SMS, MMS, IM), a social media alert, an alarm notification, a voicemail notification, a missed call notification, an incoming call notification, an end of call notification, a media information notification, and a media end notification. Another type of request to wirelessly connect to the wearable device may be an assorted type request, referred to as a type C request. The assorted type request may be prompted, for example, by a prompt generated by the mobile device being instructed by the user to connect manually to the wearable device and find the wearable device.

When the mobile device determines that the communication request to wirelessly connect to the wearable device is a setup type request (i.e. determination block 416="Type A"), in block 418 the mobile device may continue to block 424 described below with reference to FIG. 4B. When the mobile device determines that the communication request to wirelessly connect to the wearable device is a notification type request (i.e. determination block 416="Type B"), in block 420 the mobile device may continue to block 442 described below with reference to FIG. 4C. When the mobile device determines that the type of the request to wirelessly connect to the wearable device is an assorted type request (i.e. determination block 416="Type C"), in block 422 the mobile device may continue to block 454 described below with reference to FIG. 4D.

Figure 4B:
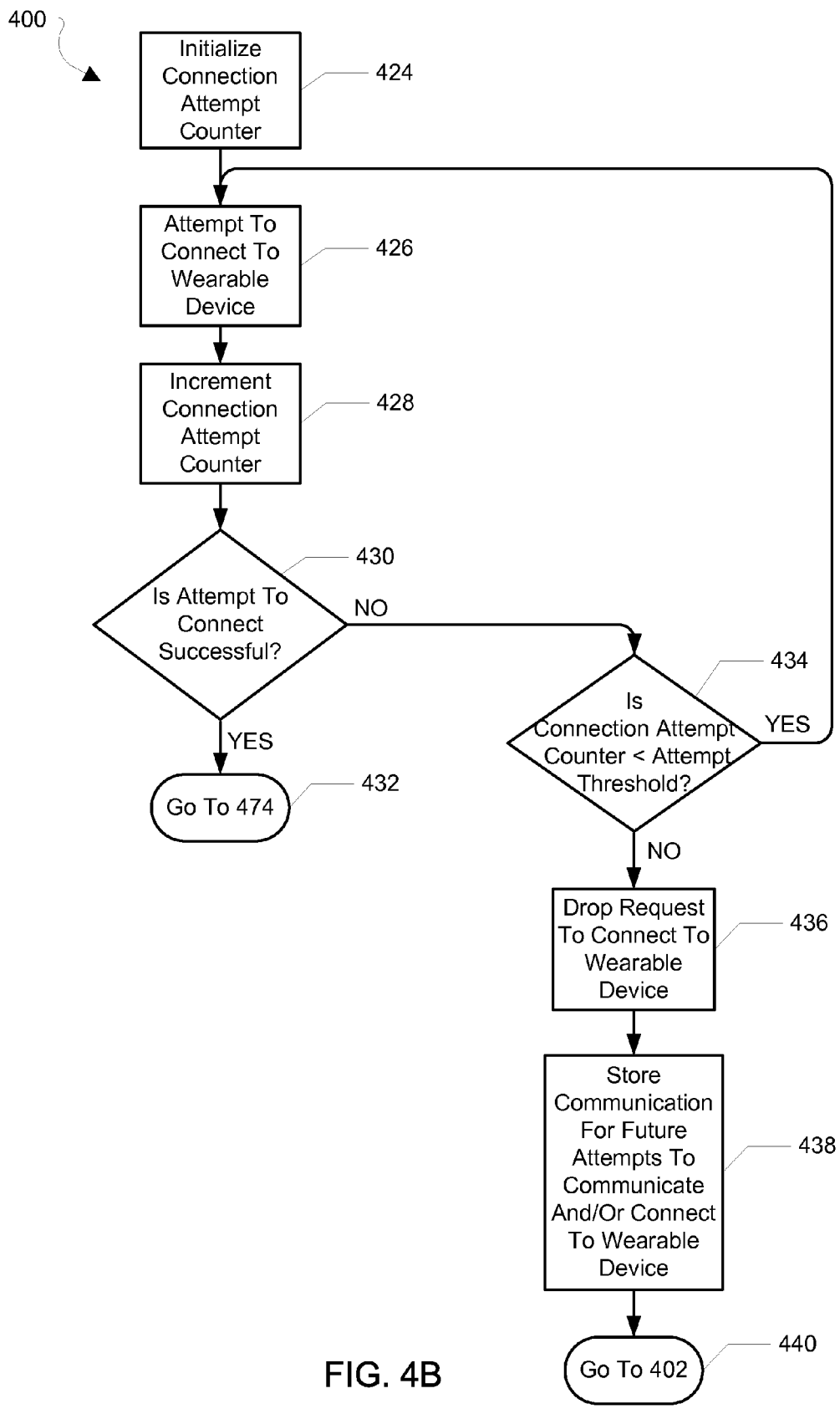

Referring to FIG. 4B, in block 424, the mobile device may initialize or set a connection attempt counter to a predetermined or calculated value. In block 426 the mobile device may attempt to wirelessly connect to the wearable device by sending or transmitting a request to wirelessly connect message. As discussed above, the mobile device may send or transmit a page message from the mobile device to the wearable device on multiple frequencies using the Bluetooth Service Discovery process to attempt to wirelessly connect to the wearable device. In block 428 the mobile device may increment or decrement the connection attempt counter configured to keep track of the number of connection attempts made by the mobile device. In other embodiments, the mobile device may use other known methods to keep track of the number of connection attempts made by the mobile device. In determination block 430 the mobile device may determine whether the attempt to connect to the wearable device is successful. When the attempt to connect to the wearable device is successful (i.e. determination block 430="Yes"), in block 432 the mobile device may continue to block 474 described below with reference to FIG. 4E.

When the attempt to connect to the wearable device fails or is unsuccessful (i.e. determination block 430="No"), the mobile device may compare the connection attempt counter to a connection attempt threshold and determine a relationship between the connection attempt counter and the connection attempt threshold in determination block 434. In various embodiments, the connection attempt threshold may be set to a preset or calculated value, which may be a static value or a dynamic value depending on various factors, such as remaining battery power or a priority of a request to connect. As an example, the connection attempt threshold may be set to a value that limits the number of attempts to connect to the wearable device to three attempts. In various embodiments, the relationship may be a variety of known comparison results.

When the relationship indicates that the connection attempt counter does not exceed or is less than, or less than or equal to, the connection attempt threshold (i.e. determination block 434="Yes"), the mobile device may return to block 426 to repeatedly attempt or continue to attempt to connect to the wearable device. When the connection attempt counter exceeds or is greater than, or greater than or equal to, the connection attempt threshold (i.e. determination block 434="No"), the mobile device may drop the request to connect to the wearable device in block 436 or otherwise suspend connection attempts. In block 438 the mobile device may store or hold the request to communicate with the wearable device, in some embodiments including the contents of the generated communication or what is to be communicated, for future attempts to connect to and/or communicate with the wearable device. In some embodiments there may only be a request to connect to the wearable device and not a request to communicate with the wearable device. In such instances, the mobile device may skip block 438, or block 438 may be implemented without result when the mobile device is configured to properly handle such situations. In block 440 the mobile device may return to block 402 (see FIG. 4A).

Figure 4C:
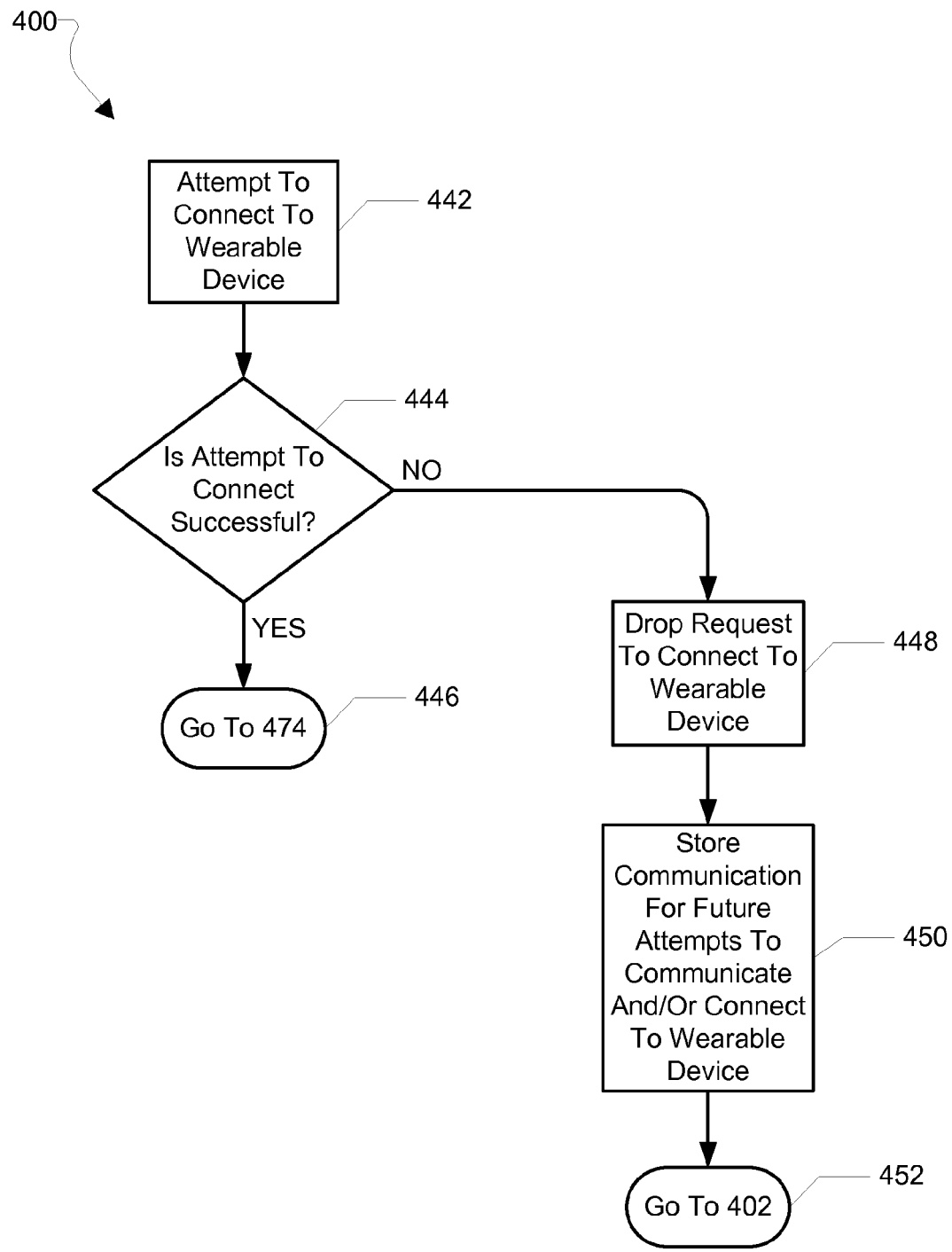

In block 442, of FIG. 4C, the mobile device may attempt to connect to the wearable device by sending or transmitting a request to wirelessly connect. As discussed above, the mobile device may transmit a page message from the mobile device to the wearable device on multiple frequencies using the Bluetooth Service Discovery process to attempt to wirelessly connect to the wearable device. In determination block 444 the mobile device may determine whether the attempt to connect to the wearable device is successful. When the attempt to connect to the wearable device is successful (i.e. determination block 444="Yes"), in block 446 the mobile device may continue to block 474 described below with reference to FIG. 4E.

When the attempt to connect to the wearable device is unsuccessful or fails (i.e. determination block 444="No"), the mobile device may drop the request to connect to the wearable device in block 448. In an embodiment illustrated in FIG. 4C, the mobile device may only attempt to connect to the wearable device once (i.e., one attempt per request to connect to the wearable device). In block 450 the mobile device may store or hold the request to communicate, in some embodiments including the contents of the generated communication or what is to be communicated, for future attempts to connect to and/or communicate with the wearable device as in block 438. In block 452 the mobile device may return to block 402 described above with reference to FIG. 4A.

Figure 4D:
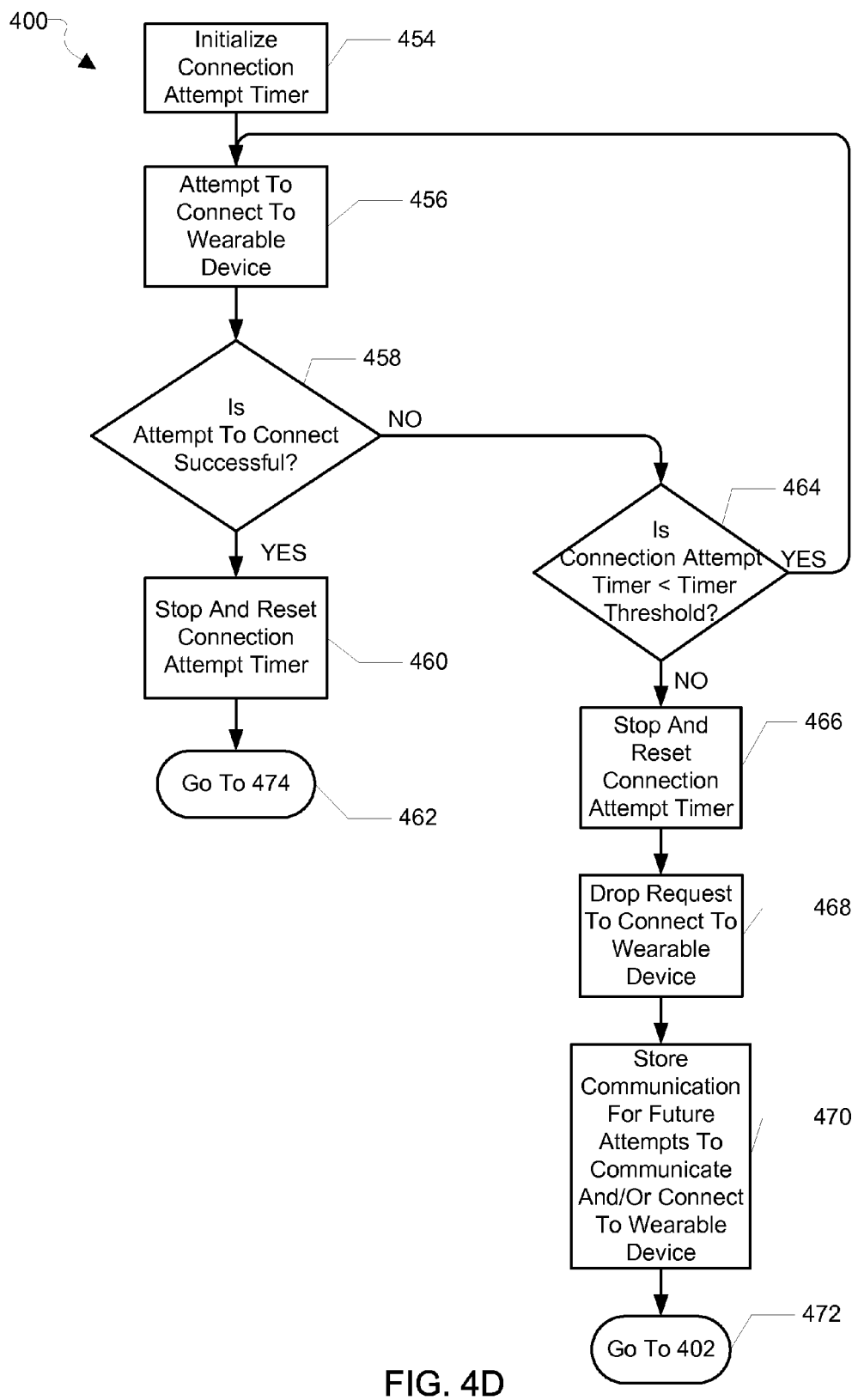

Referring to FIG. 4D, in block 454 the mobile device may initialize or start a connection attempt timer. In block 456 the mobile device may attempt to connect to the wearable device by sending or transmitting a request to wirelessly connect message. As discussed above, the mobile device may transmit a page message from the mobile device to the wearable device on multiple frequencies using the Bluetooth Service Discovery process to attempt to wirelessly connect to the wearable device. In determination block 458 the mobile device may determine whether the attempt to connect to the wearable device is successful. When the attempt to connect to the wearable device is successful (i.e. determination block 458="Yes"), the mobile device may stop and reset the connection attempt timer in block 460. In block 462 the mobile device may continue to block 474 described below with reference to FIG. 4E.

When the attempt to connect to the wearable device is unsuccessful or fails (i.e. determination block 458="No"), the mobile device may compare the connection attempt timer to a connection attempt timer threshold and determine a relationship between the connection attempt timer and the connection attempt timer threshold in determination block 464. In various embodiments, the connection attempt timer threshold may be a preset or calculated value, which may be a static value or a dynamic value depending on various factors, such as remaining battery power or a priority of a request to connect. In various embodiments, the relationship may be a variety of known comparison results.

When the connection attempt timer does not exceed or is less than, or less than or equal to, the connection attempt timer threshold (i.e. determination block 464="Yes"), the mobile device may return to block 456 to repeatedly attempt or continue to attempt to connect to the wearable device. When the connection attempt timer is greater than (i.e., exceeds), or greater than or equal to, the connection attempt timer threshold (i.e. determination block 464="No"), the mobile device may stop and reset the connection attempt timer in block 466. In block 468 the mobile device may drop the request to connect to the wearable device. In block 470 the mobile device may store or hold the request to communicate, in some embodiments including the contents of the generated communication or what is to be communicated, for future attempts to connect to and/or communicate with the wearable device as in block 438. In block 472 the mobile device may return to block 402 described above with reference to FIG. 4A.

Figure 4E:
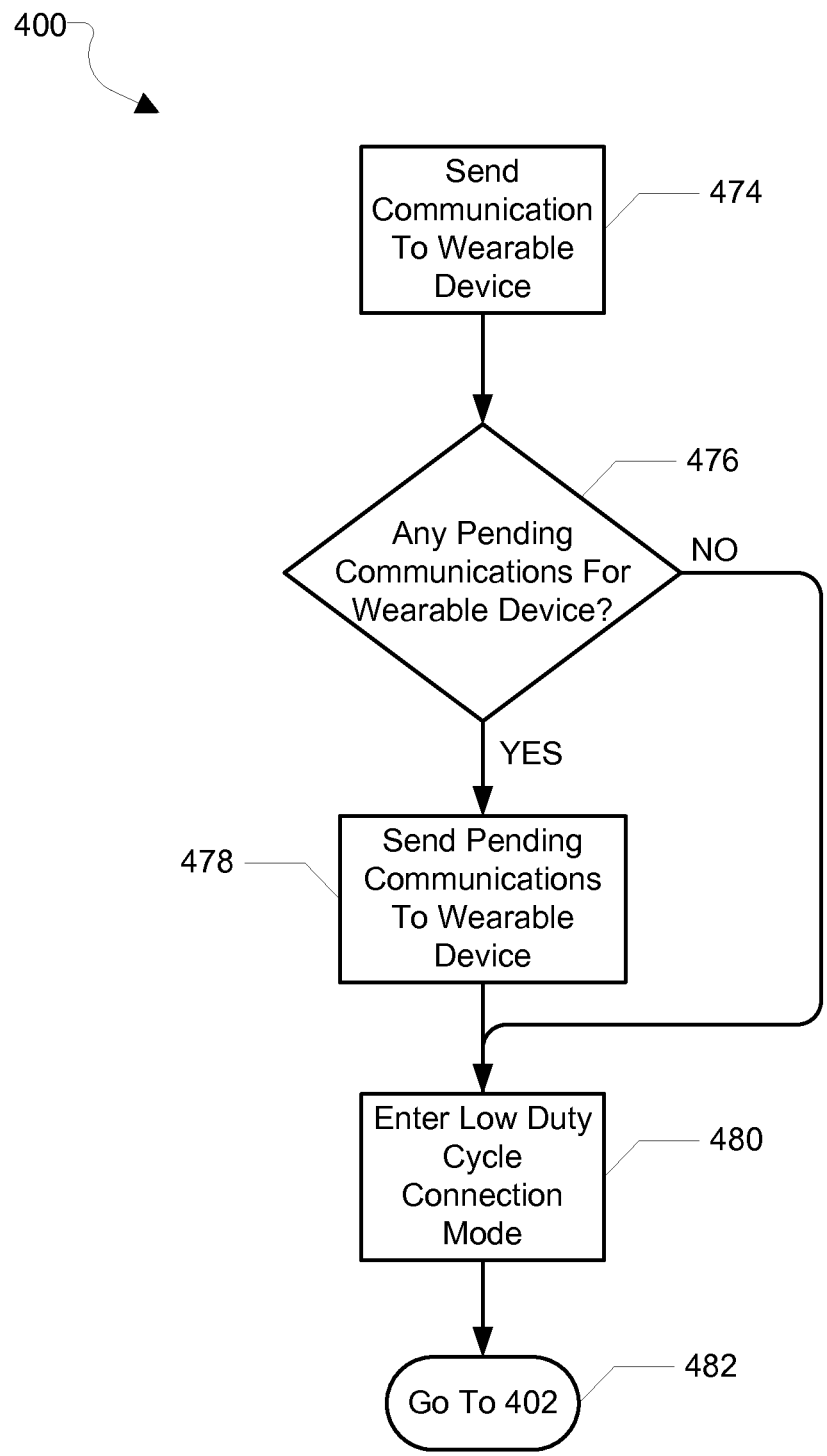

Referring to FIG. 4E, in block 474, the mobile device may send or transmit the generated communication to the wearable device. The generated communication may include the information related to the items of the display of the wearable device as described above. In determination block 476 the mobile device may determine whether there are any pending generated communications to be sent to the wearable device. Such pending generated communications may include any of the generated communications stored or held after the mobile device failed to connect to the wearable device, such as in blocks 438, 450, and 470. In another embodiment, a pending generated communication may include a request to communicate that is not associated with a request to connect and is issued when there is not an existing connection between the mobile device and the wearable device. These pending generated communications may be stored or held in memory of the mobile device. When the mobile device determines that there is a pending generated communication (i.e. the determination block 476="Yes"), the mobile device may send or transmit the pending generated communications to the wearable device in block 478.

When the mobile device determines that there are no pending generated communications, (i.e. determination block 476="No"), the mobile device may enter a connection/communication idle mode for the connection to the wearable device in block 480. Such an idle mode may maintain the hardware of the mobile device used to connect and communicate with the wearable device in a low power state. In an embodiment, the idle mode may be the Bluetooth SNIFF mode, or another type of a low duty cycle mode. In block 482 the mobile device may return to block 402 described above with reference to FIG. 4A.

FIGS. 5A-5D illustrate another embodiment method 500 for establishing or maintaining a wireless communication link between the wearable device and the mobile device. The process operations in method 500 may be embodied in processor-executable instructions that may be stored on the memory and executed by the processor of a wearable device. In block 502, the wearable device may receive a request to wirelessly connect to and/or communicate with the mobile device. This request may be prompted by a prompt generated by a function or the user of the wearable device. For example, the wearable device may execute a wearable device process causing or in response to detecting an event that results in generating a communication having information to be sent to the mobile device, such as a manual connect command, connecting to a wireless charging device, and implementing a find function for locating the mobile device. The requests may be categorized into different types, described further herein. In an embodiment, the request to connect and/or communicate may originate from the mobile device and be received by the wearable device.

In determination block 504 the wearable device may determine the type of connection request. As mentioned above, the request may be categorized by type. For example, a connection request may be a connect type request referred to here as a type D request. A connect type request may be prompted, for example, by a prompt generated by the wearable device receiving an input from a user interface, for example via the input/output interface, and powering up. As another example, a connection request may be a find type request referred to here as a type E request. A find type request may be prompted, for example, by a prompt generated by the wearable device implementing a find function for finding the mobile device. As another example, a connection request may be a disconnect type request referred to here as a type F request. A disconnect type request may be prompted, for example, by a prompt generated by the wearable device being instructed by the user to disconnect manually, losing signal quality, connecting to a wireless charging device, and powering down.

When the wearable device determines that the type of request is a disconnect type request (i.e. determination block 504="Type F"), the wearable device determines if there is an existing connection between the wearable device and the mobile device in determination block 506. When there is an existing connection between the wearable device and the mobile device (i.e. determination block 506="Yes"), the wearable device may attempt to disconnect from the mobile device or terminate the connection in block 508 and return to block 502. When the wearable device determines that there is not an existing connection between the wearable device and the mobile device (i.e. determination block 506="No"), the wearable device may return to block 502.

When the wearable device determines that the type of request is a connect or find type request (i.e. determination block 504="Type D Or E"), the wearable device may determine if there is an existing connection between the wearable device and the mobile device in determination block 510. When there is an existing connection between the wearable device and the mobile device (i.e. determination block 510="Yes"), the wearable device may drop the request to connect to the wearable device in block 512. In some instances there may not be a request to connect to the mobile device and only a request to communicate the generated communication with the mobile device. In such instances, the wearable device may skip block 512, or block 512 may be implemented without result when the wearable device is configured to properly handle such situations. In determination block 514 the wearable device may determine whether there is a request for communication. When there is not a request for communication (i.e. determination block 514="No"), the wearable device may return to block 502. When there is a request for communication (i.e. determination block 514="Yes"), in block 516 the wearable device may continue to block 556 described below with reference to FIG. 5D.

When the wearable device determines that there is not an existing connection between the wearable device and the mobile device (i.e. determination block 510="No"), the wearable device may determine the type of the request in determination block 518. When the wearable device determines that the type of request is a connect type request (i.e. determination block 518="Type D"), in block 520 the wearable device may continue to block 524 described below with reference to FIG. 5B. When the wearable device determines that the type of request is a find type request (i.e. determination block 518="Type E"), in block 522 the wearable device may continue to block 536 described below with reference to FIG. 5C.

Figure 5A:
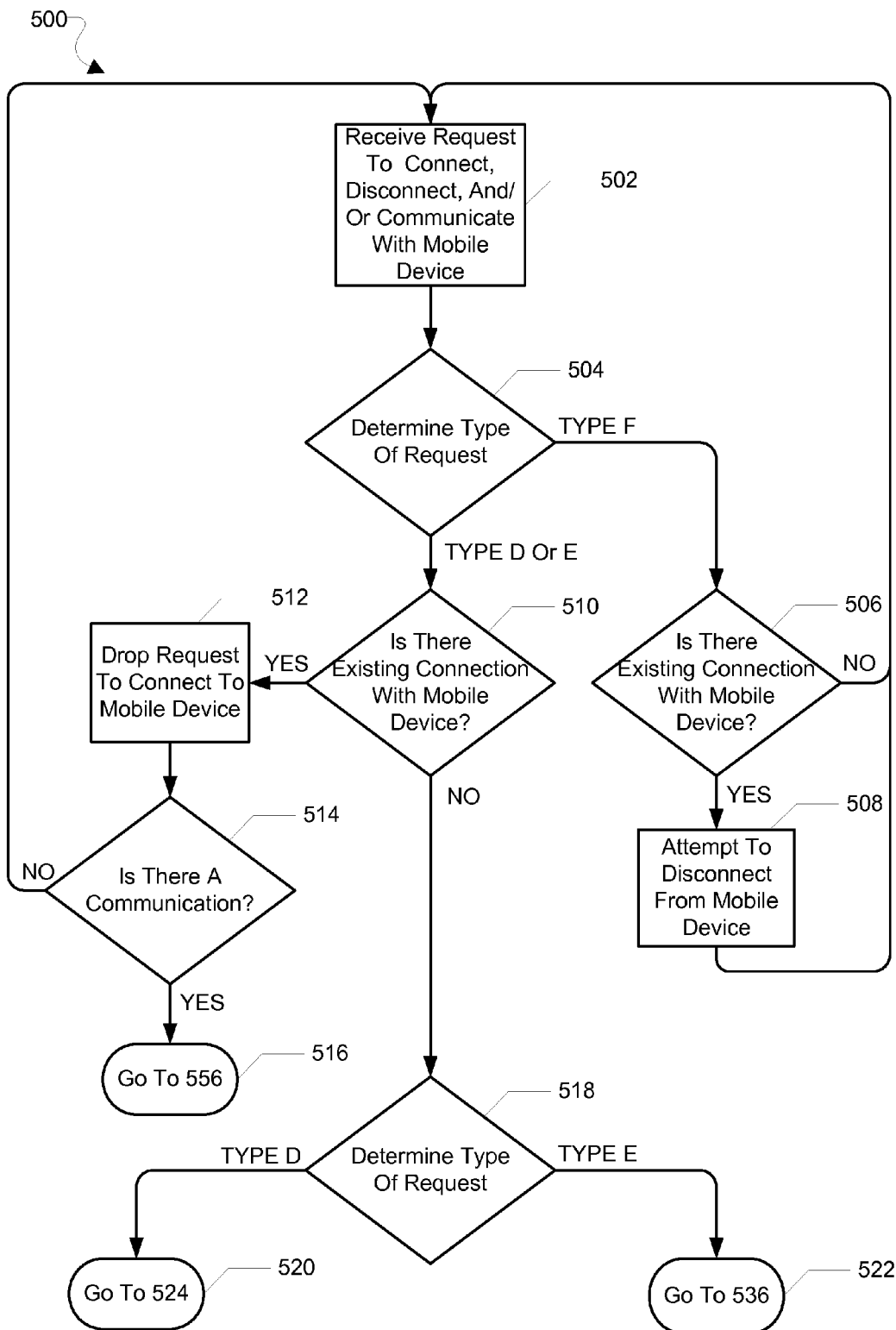
FIGS. 5A-5D are process flow diagrams illustrating another embodiment method for establishing a communication link between the mobile device and the wearable device.
Figure 5B:
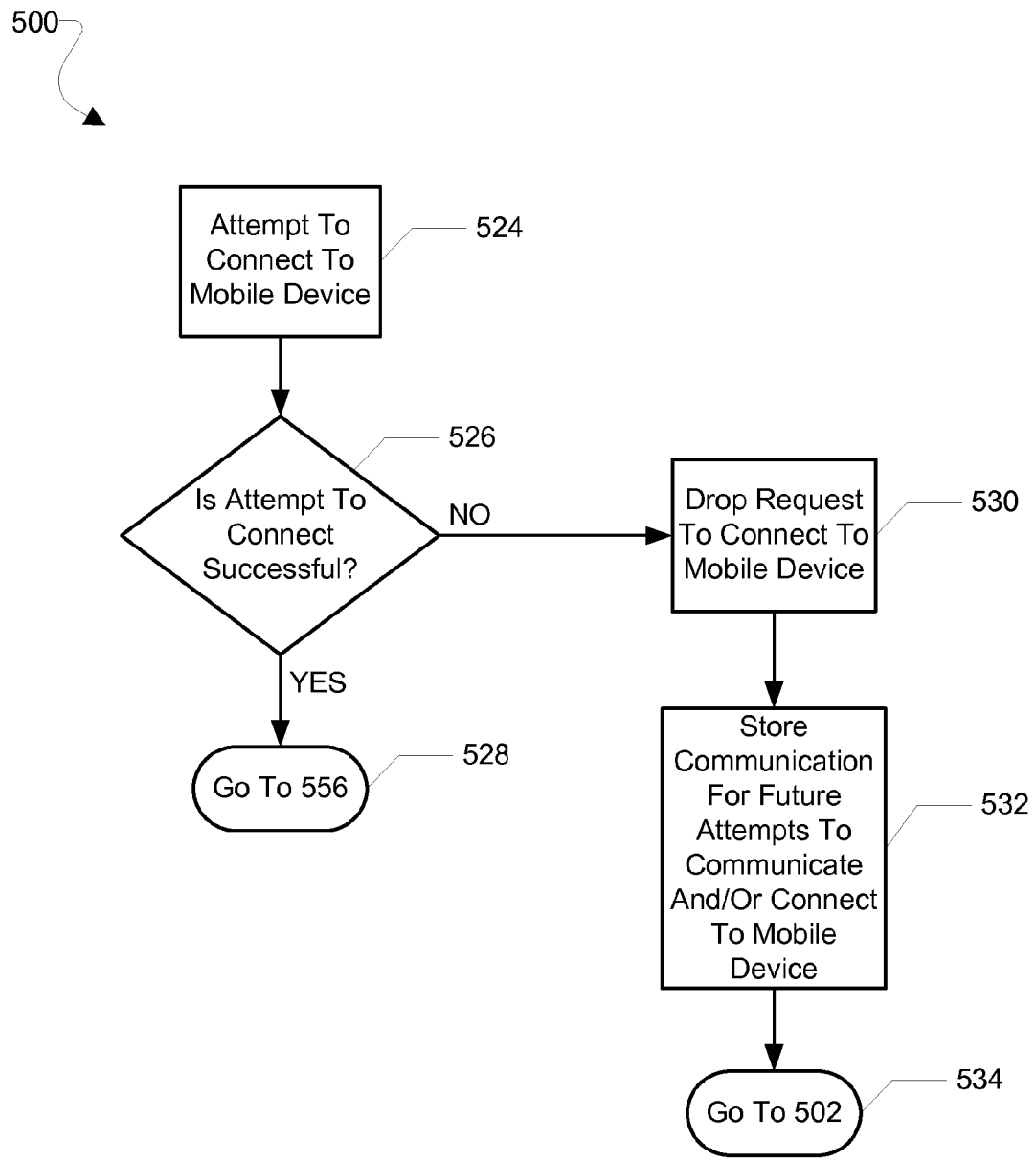

Referring to FIG. 5B, in block 524 the wearable device may attempt to connect to the mobile device by sending or transmitting a request to wirelessly connect. In determination block 526 the wearable device may determine whether the attempt to connect to the mobile device is successful. When the attempt to connect to the mobile device is successful (i.e.

determination block 526="Yes"), in block 528 the mobile device may continue to block 556 described below with reference to FIG. 5D.

When the attempt to connect to the mobile device is unsuccessful or fails (i.e. determination block 526="No"), the wearable device may drop the request to connect to the mobile device in block 530. In an embodiment illustrated in FIG. 5B, the wearable device may only attempt to connect to the mobile device once per request to connect to the wearable device. In block 532 the wearable device may store or hold the request to communicate, in some embodiments including the contents of the generated communication or what is to be communicated, for future attempts to connect to and/or communicate with the mobile device. In some embodiments there may not be a request to communicate with the mobile device and only a request to connect to the mobile device. In such instances, the wearable device may skip block 532, or block 532 may be implemented without result when the mobile device is configured to properly handle such situations. In block 534 the mobile device may return to block 502 described above with reference to FIG. 5A.

Figure 5C:
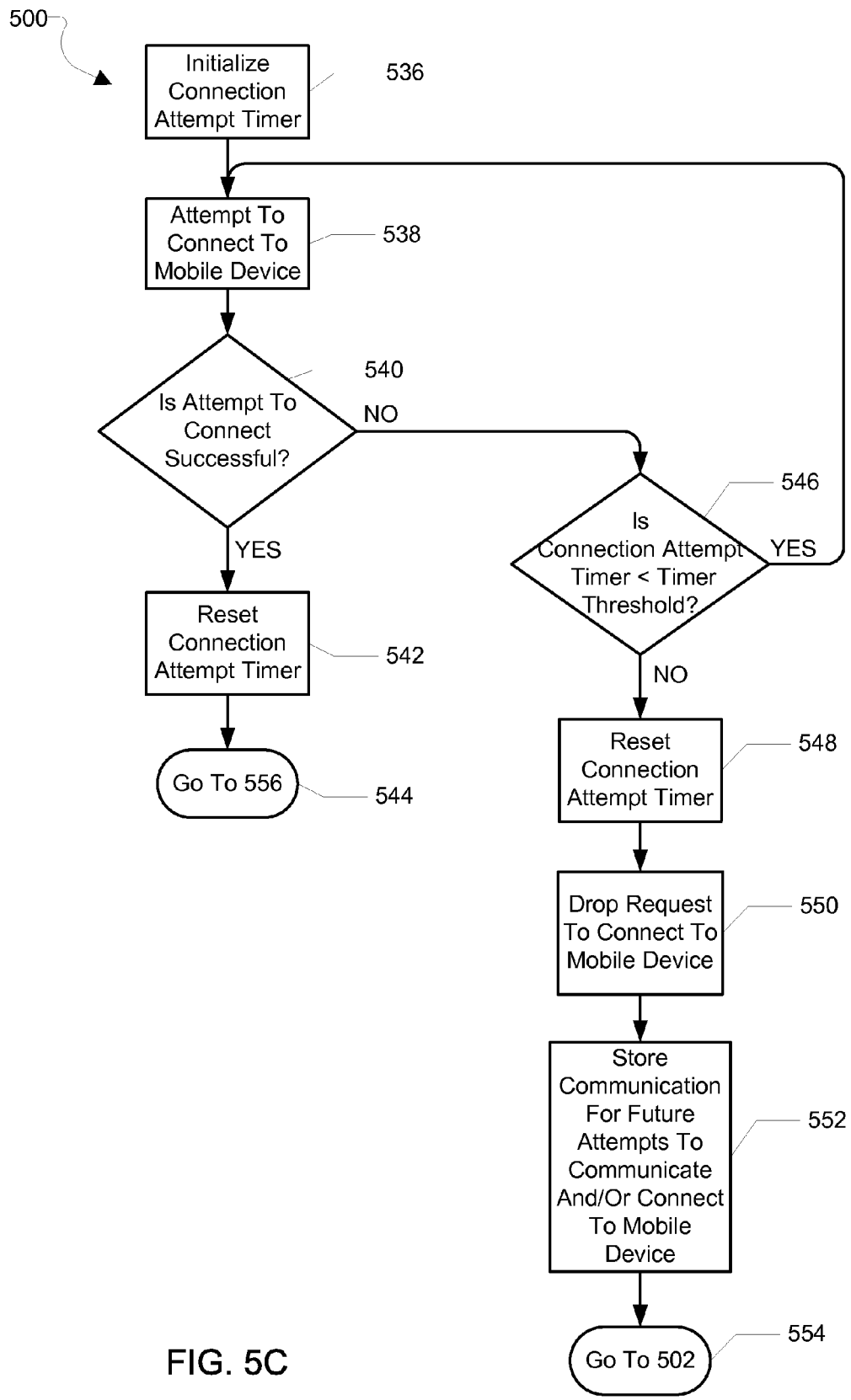

Referring to FIG. 5C, in block 536 the wearable device may initialize or start a connection attempt timer. In block 538 the wearable device may attempt to connect to the mobile device by sending or transmitting a request to wirelessly connect. In determination block 540 the wearable device may determine whether the attempt to connect to the mobile device is successful. When the attempt to connect to the mobile device is successful (i.e. determination block 540="Yes"), the wearable device may stop and reset the connection attempt timer in block 542, and in block 544 continue to block 556 described below with reference to FIG. 5D.

When the attempt to connect to the mobile device is unsuccessful or fails (i.e. determination block 540="No"), the wearable device may compare the connection attempt timer to a connection attempt timer threshold and determine a relationship between the connection attempt timer and the connection attempt timer threshold in determination block 546. In various embodiments, the connection attempt timer threshold may be set to a preset or calculated value, which may be a static value or a dynamic value dependent on various factors, such as remaining battery power or a priority of a request to connect. In various embodiments, the relationship may be a variety of known comparison results.

When the relationship indicates that the connection attempt timer does not exceed or is less than, or less than or equal to, the connection attempt timer threshold (i.e. determination block 546="Yes"), the wearable device may return to block 538 to continue to attempt to connect to the mobile device. When the relationship indicates that the connection attempt timer exceeds or is greater than, or greater than or equal to, the connection attempt timer threshold (i.e. determination block 546="No"), the wearable device may stop and reset the connection attempt timer in block 548, and in block 550 the wearable device may drop the request to connect to the mobile device. In block 552 the wearable device may hold the request to communicate, in some embodiments including the contents of the generated communication or what is to be communicated, for future attempts to connect to and/or communicate with the wearable device, like in block 532. In block 554 the wearable device may return to block 502 described above with reference to FIG. 5A.

Figure 5D:
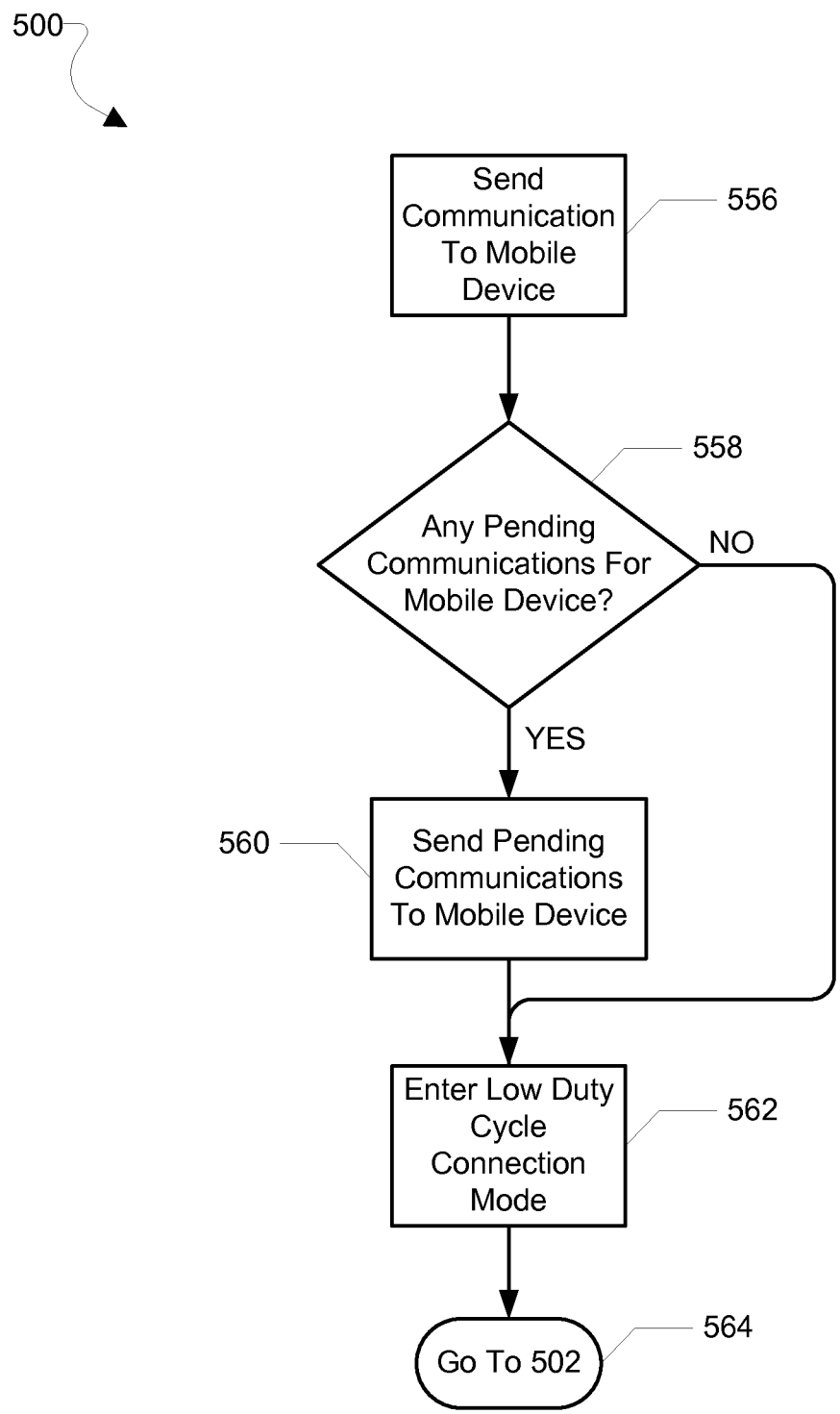

Referring to FIG. 5D, in block 556 the wearable device may send or transmit the generated communication to the mobile device. The generated communication may include the information related to the connect, find, or disconnect type requests described herein. In determination block 558 the wearable device may determine if there are any pending generated communications to be sent to the mobile device. The pending generated communications may include any of the communications stored or held after the wearable device failed to connect to the mobile device, such as in blocks 532 and 552. In another embodiment, a pending generated communication may include a request to communicate that is not associated with a request to connect and is issued when there is not an existing connection between the wearable device and the mobile device. These pending generated communications may be stored or held in the memory of the wearable device. When the wearable device determines that there is a pending communication (i.e. determination block 558="Yes"), the wearable device may send or transmit the pending generated communications to the mobile device in block 560.

When the wearable device determines that there are no pending generated communications, (i.e. determination block 558="No"), the wearable device may enter a connection/communication idle mode for the connection to the mobile device in block 562. Such an idle mode may maintain the hardware of the wearable device used to connect and communicate with the mobile device in a low power state. In an embodiment, the idle mode may be the Bluetooth SNIFF mode, or another type of a low duty cycle mode. In block 564 the wearable device may return to block 502 described above with reference to FIG. 5A.

Figure 6A:
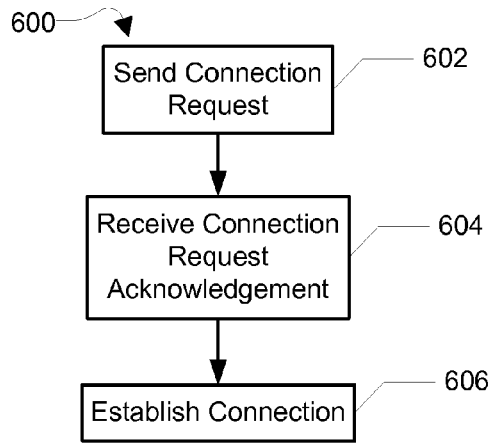
FIGS. 6A and 6B are process flow diagrams illustrating embodiment methods for making a connection between a wearable device and a mobile device.
Figure 6B:
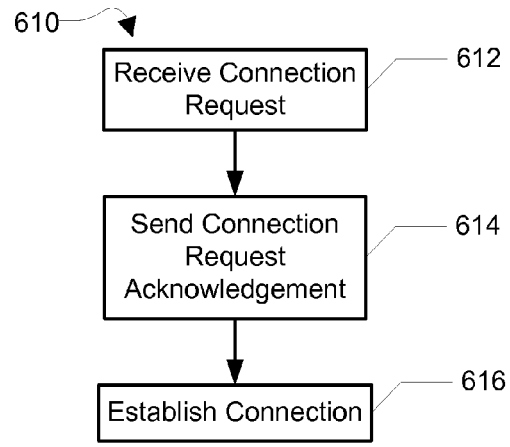

FIGS. 6A and 6B illustrate embodiment methods for making a wireless communication connection 600, 610, between the wearable device and the mobile device. Either the wearable device or the mobile device may implement one of the methods 600 or 610, while the other device implements the other method 610 or 600. The process operations of the embodiment methods may be embodied in processor-executable instructions that may be stored in the memory and executed by the processor of the wearable device and/or the mobile device. Referring to FIG. 6A, in block 602, the requesting device, which is the device implementing method 600, may send a request to connect to the receiving device, which is the device implementing method 610. As discussed above, the wearable device may be the requesting device and may transmit a connection attempt to the mobile device (which is the receiving device in this example) in response to a user interaction with the wearable device when the wireless connection is not established with the mobile device. In block 604 the requesting device may receive a request to connect acknowledgment from the receiving device. In block 606 the requesting device may establish a wireless connection or connect to the receiving device.

Referring to FIG. 6B, the method for making a connection 610 may be implemented in response to the request to connect from the requesting device in block 602 (see FIG. 6A). In block 612 the receiving device, while listening for a connection attempt by a requesting device, may receive the request to connect from the requesting device. As discussed above, the mobile device may be the receiving device and may listen for connection attempts by the wearable device (the requesting device in this example) while the mobile device is streaming audio data to the wirelessly connected peripheral device. In block 614 the receiving device may send the request to connect acknowledgement. In block 616 the receiving device may establish a wireless connection or connect to the requesting device.

Figure 7A:
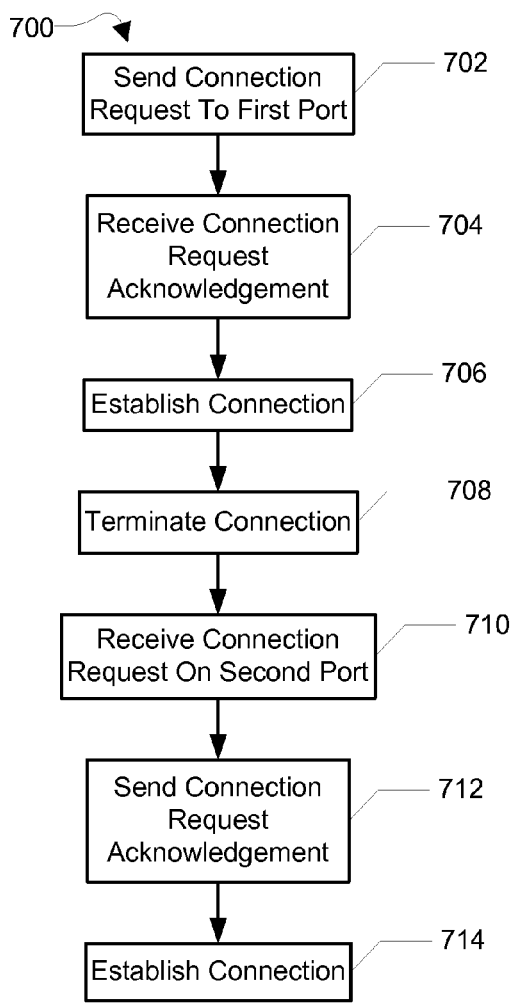
FIGS. 7A and 7B are process flow diagrams illustrating embodiment methods for making a connection between a wearable device and a mobile device.
Figure 7B:
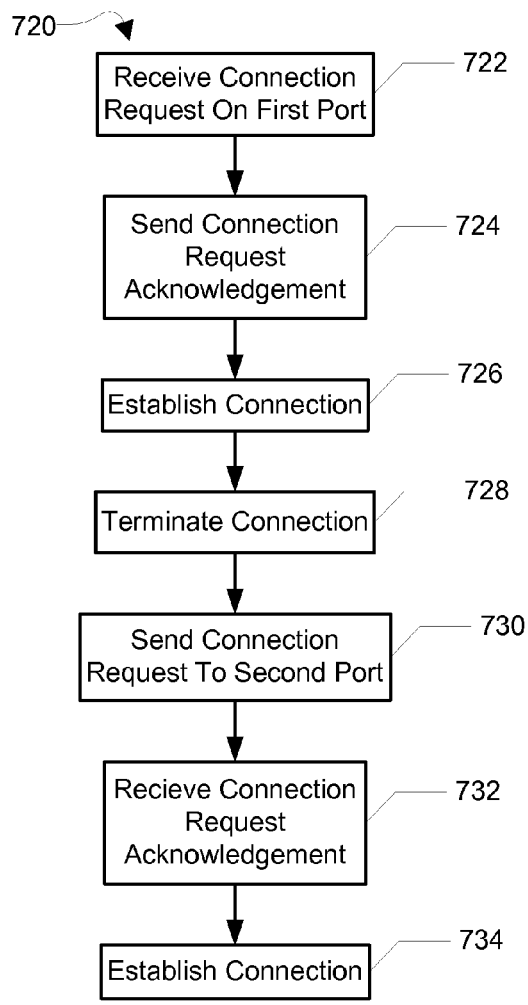

FIGS. 7A and 7B illustrate embodiment methods for making a wireless communication connection 700, 720, between the wearable device and the mobile device. Either the wearable device or the mobile device may implement one of the methods 700 or 720, while the other device implements the other method 720 or 700. The process operations of these embodiment methods may be embodied in processor-executable instructions that may be stored in the memory and executed by the processor of the wearable device and/or the mobile device. Implementation of these methods for making a connection 700, 720 may help to avoid a race condition between the wearable device and the mobile device that might otherwise occur when each device attempts to connect to the other device. Since the devices might attempt to connect to each other on the same port of the respective devices or on the same channel, the race condition may be averted by designating one of the wearable device or the mobile device as the device for implementing embodiment method 700 and the other for implementing embodiment method 720. The device designated for implementing embodiment method 720 may be ultimately responsible for creating the connection that is used to communicate data. Embodiment method 720 for making a connection may be implemented in response to the other device implementing embodiment method 700. In an embodiment, the device designated to implement embodiment method 720 may also implement embodiment method 600 for making a connection when initiating a connection on its own, rather than being responsible initiating a connection.

In block 702 the requesting device, which is the device implementing method 700, may send a request to wirelessly connect to the receiving device, which is the device implementing method 710. The request to connect may be sent to a first port of the receiving device. In block 704 the requesting device may receive a request-to-wirelessly-connect acknowledgment from the receiving device. In block 706 the requesting device may establish a wireless connection with (i.e., connect to) the receiving device. In an embodiment, this connection may only prompt a response from the receiving device as detailed below with reference to FIG. 7B, and no data may be transmitted over this connection. In block 708 the requesting device may terminate the wireless connection (i.e., disconnect from) the receiving device, which may be accomplished in response to a termination or disconnect message received from the receiving device or after an elapsed time. This termination or disconnect of an established communication is accomplished in order to ensure that the mobile device and wearable device use a consistent communication protocol in which the mobile device establishes the communication links that are used for communicating data between the devices. In block 710 the requesting device may receive a request to establish another wireless connection with the receiving device, which may be sent as a response request to connect from the receiving device. The request to establish another (i.e., second) wireless connection with or response request to connect from the receiving device may be received on a second port of the requesting device that is different from the first port of the receiving device. In block 712 the requesting device may send a request to establish the another (i.e., second) wireless connection acknowledgement or a response request to connect acknowledgement to the receiving device. In block 714 the requesting device may establish the second wireless connection (i.e., connect to) the receiving device.

Referring to FIG. 7B, the embodiment method 720 for making a connection may be implemented in response to the request to connect from the requesting device in block 702 described above with reference to FIG. 7A. In block 722 the receiving device may receive the request to wirelessly connect from the requesting device. The request to wirelessly connect may be received on a first port of the receiving device. In block 724 the receiving device may send the request-to-wirelessly-connect acknowledgment to the requesting device. In block 726 the receiving device may establish the wireless connection (i.e., connect to) the requesting device. In an embodiment, this connection may only be a response to the requesting device's request for connection, and no data may be transmitted over this connection. In block 728 the receiving device may send a termination or a disconnect message and terminate the wireless connection with or disconnect from the requesting device. Alternatively, the receiving device may terminate the wireless connection with or disconnect from the requesting device after an elapsed time. In an embodiment, the receiving device may not need to terminate the wireless connection with or disconnect from the requesting device since termination or disconnection may be executed by the requesting device. The receiving device may recognize the termination or disconnection of the wireless connection from the requesting device. In an embodiment, the receiving device may recognize when the termination or disconnection of the wireless connection occurs after or within a predefined elapsed time. In such an embodiment, the receiving device may skip block 728. In block 730 the receiving device may send the request to establish the other (i.e., second) wireless connection with the requesting device, which may be in the form of a response request to connect to the requesting device. The request to establish a second wireless connection with the requesting device may be sent to a second port of the requesting device that is different from the first port of the receiving device. In block 732 the receiving device may receive the request to establish the second wireless connection acknowledgement from the requesting device. In block 734 the receiving device may establish the other wireless connection with (i.e., connect to) the requesting device. These methods for making a connection 700, 720, between the wearable device and the mobile device may be implemented such that the device that creates less interference and/or uses less battery power when connecting and maintaining the connection, in this case the receiving device, may be tasked with creating and maintaining the connection between the two devices.

Figure 8:
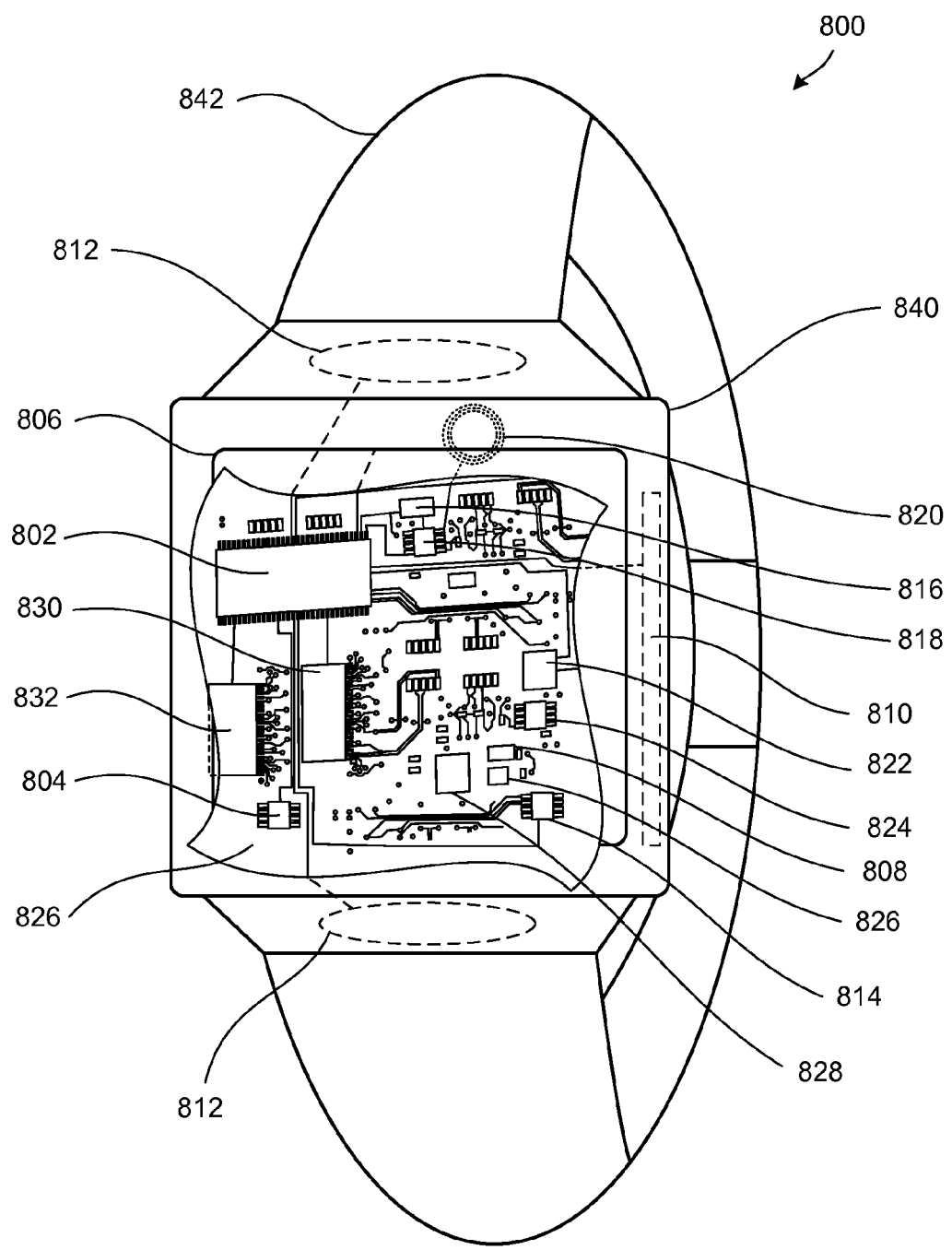
FIG. 8 is component block diagram illustrating an exemplary wearable device suitable for use with the various embodiments.

FIG. 8 illustrates an exemplary wearable device 800 suitable for use with the various embodiments. The wearable device 800 may include a processor 802 coupled to a volatile and/or non-volatile internal memory 804, which may be secure and/or encrypted memories, unsecure and/or unencrypted memories, or any combination thereof.

The processor 802 may also be coupled to an electronic display screen 806, which may be a touch screen display (e.g., resistive-sensing touch screen, capacitive-sensing touch screen, infrared sensing touch screen, etc.). A touch screen controller 828 may be coupled to the processor 802 and the electronic display screen 806. The wearable device 800 may include wide area network (WAN) communications circuitry, such as one or more transceivers 814, such as a cellular telephone transceiver or LTE radio module, coupled to an antenna 808 for sending and receiving electromagnetic radiation. The WAN transceiver 814 and antenna 808 may be used to communicate information over a cellular communications network. The wearable device 800 may also include low-power short range communication circuitry 824, such as a Bluetooth transceiver 824, coupled to an antenna 826 and to the processor 802. The low-power short range communication circuitry 824 may be configured to communicate with a compatible transceiver in the mobile device using one or more of Bluetooth®, WiFi, Peanut®, ZigBee®, ANT, or other low power wireless communication protocol currently available or which may be developed in the future.

The wearable device 800 may further include a slide sensor 810 and physical buttons 812 for receiving user inputs. The wearable device 800 may also include a battery 816 coupled to an inductive charging circuit 818, and a coil antenna 820 which may be an inductive coil adapted to enable inductive charging of the battery 816. The battery 816 and inductive charging circuit 818 may be coupled to the processor 802 to enable the wearable device 800 to control inductive charging and generate messages via the coil antenna 820. The wearable device 800 may further include a vibratory motor 822, and various sensors (e.g., gyroscopes, accelerometers, pedometers, thermometers, thermocouples, etc.) 830, all of which may be coupled to the processor 802.

The wearable device 800 may include a global positioning system receiver 830 that is coupled to the processor 802 and which supports United States Global Positioning System (GPS) or other global navigation or satellite positioning systems, such as the Russian GLONASS system and the European Galileo System. The wearable device 800 may also include a biological or physiological sensor 832 configured to monitor one or more physiological parameters, such as heart rate, variability in heart rate, breathing rate, arrhythmia of the heart (if any), general rhythm and functioning of the heart, blood pressure, body movements (i.e., physical activity), steps taken (e.g., a pedometer), body position, body temperature, presence and quantity of sweat, oxygenation, etc. Such sensor(s) 832 may be coupled to the processor 802.

The electrical components of the wearable device 800 may be integrated and coupled together using surface mount technologies in which components are mounted or placed directly onto the surface of a printed circuit board 826, on a conventional circuit board 826 with through-board connections, multi-chip modules, system on chips (SoC), or any other electrical component mounting, manufacturing, or electronics technology that is currently known or which may be developed in the future.

The electrical components of the wearable device 800 may be integrated within a package encompassed by a bezel 840 surrounding the electronic display screen 806 that is coupled to a wrist band 842 so that it can be worn by a user like an ordinary watch.

Figure 9:
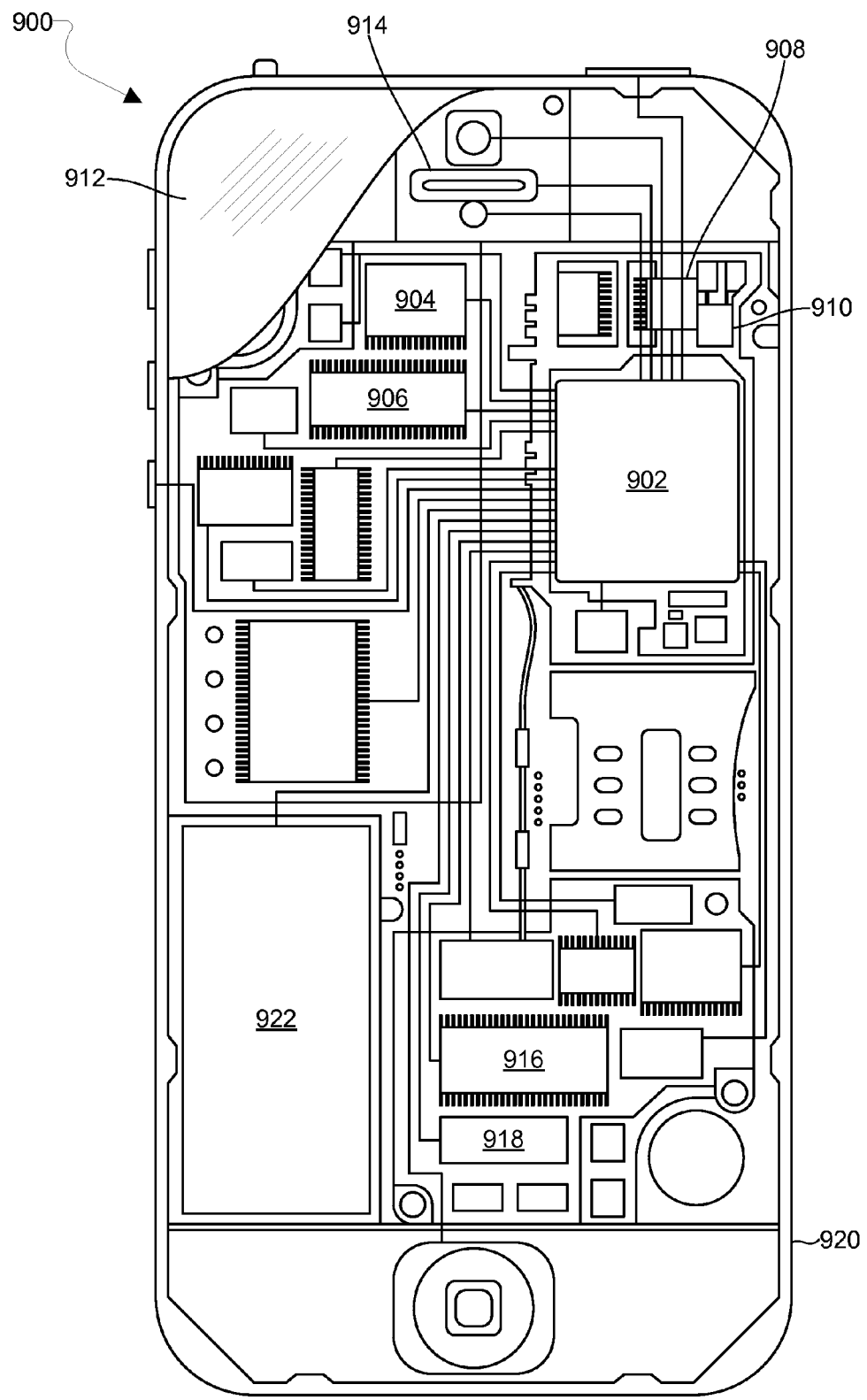
FIG. 9 is component block diagram illustrating an exemplary mobile device suitable for use with the various embodiments.

FIG. 9 illustrates an exemplary mobile device 900 suitable for use with the various embodiments. In various embodiments, the mobile device 900 may include a processor 902 coupled to a touchscreen controller 904 and an internal memory 906. The processor 902 may be one or more multicore ICs designated for general or specific processing tasks. The internal memory 906 may be volatile or non-volatile memory, and may also be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc. The mobile device 900 may have one or more radio signal transceivers 908 (e.g., Peanut®, Bluetooth®, Zigbee®, Wi-Fi, RF radio) and antennae 910, for sending and receiving, coupled to each other and/or to the processor 902. The transceivers 908 and antennae 910 may be used with the above-mentioned circuitry to implement the various wireless transmission protocol stacks and interfaces. The mobile device 900 may include a cellular network wireless modem chip 916 that enables communication via a cellular network and is coupled to the processor. The mobile device 900 may include a peripheral device connection interface 918 coupled to the processor 902. The peripheral device connection interface 918 may be singularly configured to accept one type of connection, or multiply configured to accept various types of physical and communication connections, common or proprietary, such as USB, FireWire, Thunderbolt, or PCIe. The peripheral device connection interface 918 may also be coupled to a similarly configured peripheral device connection port (not shown). The mobile device 900 may also include speakers 914 for providing audio outputs. The mobile device 900 may also include a housing 920, constructed of a plastic, metal, or a combination of materials, for containing all or some of the components discussed herein. The mobile device 900 may include a power source 922 coupled to the processor 902, such as a disposable or rechargeable battery. The rechargeable battery 922 may also be coupled to the peripheral device connection port to receive a charging current from a source external to the mobile device 900.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic circuit, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for a mobile device to wirelessly connect and communicate with a wearable device when the mobile device is also wirelessly connected to a peripheral audio device, comprising:
   determining whether the mobile device is streaming audio data to the wirelessly connected peripheral audio device;
   deferring sending from the mobile device to the wearable device a request to wirelessly connect to the wearable device in response to determining that the mobile device is streaming audio data to the wirelessly connected peripheral audio device;
   determining whether the mobile device has stopped streaming audio data to the wirelessly connected peripheral audio device; and
   sending from the mobile device to the wearable device a request to wirelessly connect to the wearable device in response to determining that the mobile device has stopped streaming audio data to the wirelessly connected peripheral audio device.

2. The method of claim 1, further comprising:
   listening by the mobile device for a connection attempt by the wearable device while the mobile device is streaming audio data to the wirelessly connected peripheral audio device;
   receiving a connection attempt from the wearable device on the mobile device, the connection attempt transmitted to the mobile device in response to a user interaction with the wearable device when a wireless connection is not established with the mobile device; and
   establishing a wireless connection between the mobile device and the wearable device in response to the mobile device receiving the connection attempt from the wearable device.

3. The method of claim 2, further comprising:
   establishing by the mobile device a first wireless connection between the mobile device and the wearable device;
   terminating by the mobile device the first wireless connection between the mobile device and the wearable device;
   receiving in the mobile device from the wearable device a second request to establish a second wireless connection; and
   establishing by the wearable device the second wireless connection between the mobile device and the wearable device.

4. The method of claim 1, further comprising:
   generating a communication configured to be sent from the mobile device to the wearable device in response to detecting an event on the mobile device; and
   determining a type of the request to wirelessly connect to the wearable device.

5. The method of claim 4, further comprising performing the following operations in response to determining that the type of the request to wirelessly connect to the wearable device is a setup type request:
   initializing a connection attempt counter;
   attempting to wirelessly connect to the wearable device and incrementing the connection attempt counter;
   determining whether the attempt to connect to the wearable device succeeded;
   sending from the mobile device to the wearable device the generated communication in response to determining that the attempt to connect to the wearable device succeeded;
   determining whether the connection attempt counter exceeds a connection attempt threshold in response to determining that the attempt to connect to the wearable device did not succeed;
   repeatedly attempting to connect to the wearable device in response to determining that the attempt to connect to the wearable device did not succeed and that the connection attempt counter does not exceed the connection attempt threshold; and
   dropping the request to wirelessly connect to the wearable device and storing the generated communication from the mobile device to the wearable device for transmission in a future wireless connection with the wearable device in response to determining that the connection attempt counter exceeds the connection attempt threshold.

6. The method of claim 4, further comprising performing the following operations in response to determining that the type of the request to wirelessly connect to the wearable device is a notification type request:
- making a single attempt to wirelessly connect to the wearable device;
- determining whether the attempt to connect to the wearable device succeeded;
- sending from the mobile device to the wearable device the generated communication in response to determining that the attempt to connect to the wearable device succeeded; and
- dropping the request to wirelessly connect to the wearable device and storing the generated communication from the mobile device to the wearable device for a future wireless connection with the wearable device in response to determining that the attempt to connect to the wearable device did not succeed.

7. The method of claim 4, further comprising performing the following operations in response to determining that the type of the request to wirelessly connect to the wearable device is an assorted type request:
- initializing a connection attempt timer;
- attempting to wirelessly connect to the wearable device;
- determining whether the attempt to connect to the wearable device succeeded;
- sending from the mobile device to the wearable device the generated communication in response to determining that the attempt to connect to the wearable device succeeded;
- determining whether the connection attempt timer exceeds a connection attempt timer threshold in response to determining that the attempt to connect to the wearable device did not succeed;
- repeatedly attempting to connect to the wearable device in response to determining that the attempt to connect to the wearable device did not succeed and that the connection attempt timer does not exceed the connection attempt timer threshold; and
- dropping the request to wirelessly connect to the wearable device and storing the generated communication from the mobile device to the wearable device for a future wireless connection with the wearable device in response to determining that the connection attempt timer exceeds the connection attempt timer threshold.

8. The method of claim 1, wherein:
determining whether the mobile device is streaming audio data to the wirelessly connected peripheral audio device comprises determining whether the mobile device is streaming audio data to the wirelessly connected peripheral audio device on a Bluetooth connection;
determining whether the mobile device has stopped streaming audio data to the wirelessly connected peripheral audio device comprises determining whether the mobile device has ended the Bluetooth connection or entered a low duty cycle mode for the Bluetooth connection to the wirelessly connected peripheral audio device; and
sending from the mobile device to the wearable device a request to wirelessly connect to the wearable device in response to determining that the mobile device has stopped streaming audio data to the wirelessly connected peripheral audio device comprises sending a page message from the mobile device to the wearable device on multiple frequencies using a Bluetooth Service Discovery process in response to determining that the mobile device has ended the Bluetooth connection or entered the low duty cycle mode for the Bluetooth connection to the wirelessly connected peripheral audio device.

9. A mobile device, comprising a processor configured with processor-executable instructions to perform operations comprising:
- determining whether the mobile device is streaming audio data to a wirelessly connected peripheral audio device;
- deferring sending to a wearable device a request to wirelessly connect to the wearable device in response to determining that the mobile device is streaming audio data to the wirelessly connected peripheral audio device;
- determining whether the mobile device has stopped streaming audio data to the wirelessly connected peripheral audio device; and
- sending to the wearable device a request to wirelessly connect to the wearable device in response to determining that the mobile device has stopped streaming audio data to the wirelessly connected peripheral audio device.

10. The mobile device of claim 9, wherein the processor is configured with processor-executable instructions to perform operations further comprising:
- listening for a connection attempt by the wearable device while the mobile device is streaming audio data to the wirelessly connected peripheral audio device;
- receiving a connection attempt from the wearable device; and
- establishing a wireless connection between the mobile device and the wearable device in response to the mobile device receiving the connection attempt from the wearable device.

11. The mobile device of claim 10, wherein the processor is configured with processor-executable instructions to perform operations further comprising:
- establishing a first wireless connection between the mobile device and the wearable device;
- terminating the first wireless connection between the mobile device and the wearable device;
- receiving from the wearable device a second request to establish a second wireless connection; and
- establishing the second wireless connection between the mobile device and the wearable device.

12. The mobile device of claim 9, wherein the processor is configured with processor-executable instructions to perform operations further comprising:
- generating a communication configured to be sent to the wearable device in response to detecting an event on the mobile device; and
- determining a type of the request to wirelessly connect to the wearable device.

13. The mobile device of claim 12, wherein the processor is further configured with processor-executable instructions to perform the following operations in response to determining that the type of the request to wirelessly connect to the wearable device is a setup type request:
- initializing a connection attempt counter;
- attempting to wirelessly connect to the wearable device and incrementing the connection attempt counter;
- determining whether the attempt to connect to the wearable device succeeded;
- sending to the wearable device the generated communication in response to determining that the attempt to connect to the wearable device succeeded;
- determining whether the connection attempt counter exceeds a connection attempt threshold in response to determining that the attempt to connect to the wearable device did not succeed;

repeatedly attempting to connect to the wearable device in response to determining that the attempt to connect to the wearable device did not succeed and that the connection attempt counter does not exceed the connection attempt threshold; and dropping the request to wirelessly connect to the wearable device and storing the generated communication for transmission in a future wireless connection with the wearable device in response to determining that the connection attempt counter exceeds the connection attempt threshold.

14. The mobile device of claim 12, wherein the processor is further configured with processor-executable instructions to perform the following operations in response to determining that the type of the request to wirelessly connect to the wearable device is a notification type request:

making a single attempt to wirelessly connect to the wearable device;

determining whether the attempt to connect to the wearable device succeeded;

sending from the mobile device to the wearable device the generated communication in response to determining that the attempt to connect to the wearable device succeeded; and dropping the request to wirelessly connect to the wearable device and storing the generated communication from the mobile device to the wearable device for a future wireless connection with the wearable device in response to determining that the attempt to connect to the wearable device did not succeed.

15. The mobile device of claim 12, wherein the processor is further configured with processor-executable instructions to perform the following operations in response to determining that the type of the request to wirelessly connect to the wearable device is an assorted type request:

initializing a connection attempt timer;

attempting to wirelessly connect to the wearable device;

determining whether the attempt to connect to the wearable device succeeded;

sending to the wearable device the generated communication in response to determining that the attempt to connect to the wearable device succeeded;

determining whether the connection attempt timer exceeds a connection attempt timer threshold in response to determining that the attempt to connect to the wearable device did not succeed;

repeatedly attempting to connect to the wearable device in response to determining that the attempt to connect to the wearable device did not succeed and that the connection attempt timer does not exceed the connection attempt timer threshold; and dropping the request to wirelessly connect to the wearable device and storing the generated communication to the wearable device for a future wireless connection with the wearable device in response to determining that the connection attempt timer exceeds the connection attempt timer threshold.

16. The mobile device of claim 9, wherein determining whether the mobile device is streaming audio data to the wirelessly connected peripheral audio device comprises determining whether the mobile device is streaming audio data to the wirelessly connected peripheral audio device on a Bluetooth connection;

wherein determining whether the mobile device has stopped streaming audio data to the wirelessly connected peripheral audio device comprises determining whether the mobile device has ended the Bluetooth connection or entered a low duty cycle mode for the Bluetooth connection to the wirelessly connected peripheral audio device; and wherein sending to the wearable device a request to wirelessly connect to the wearable device in response to determining that the mobile device has stopped streaming audio data to the wirelessly connected peripheral audio device comprises sending a page message to the wearable device on multiple frequencies using a Bluetooth Service Discovery process in response to determining that the mobile device has ended the Bluetooth connection or entered the low duty cycle mode for the Bluetooth connection to the wirelessly connected peripheral audio device.

17. A communication system, comprising:

a peripheral audio device configured to receive streaming audio data over a first wireless connection;

a mobile device configured to transmit streaming audio data over the first wireless connection to the peripheral audio device; and a wearable device configured to connect wirelessly to the mobile device over a second wireless connection, wherein the mobile device comprises a mobile device processor configured with processor-executable instructions to perform operations comprising:

determining whether the mobile device is streaming audio data to the wirelessly connected peripheral audio device;

deferring sending to the wearable device a request to wirelessly connect to the wearable device in response to determining that the mobile device is streaming audio data to the wirelessly connected peripheral audio device;

determining whether the mobile device has stopped streaming audio data to the wirelessly connected peripheral audio device; and sending to the wearable device a request to wirelessly connect to the wearable device in response to determining that the mobile device has stopped streaming audio data to the wirelessly connected peripheral audio device, and wherein the wearable device comprises a wearable device processor configured with processor-executable instructions to perform operations, comprising:

receiving from the mobile device on the wearable device the request to wirelessly connect to the wearable device; and establishing a second wireless connection with the mobile device in response to receiving the request to wirelessly connect to the wearable device.

18. The communication system of claim 17, wherein:

the wearable device processor is further configured with processor-executable instructions to perform operations comprising transmitting a connection attempt to the mobile device in response to a user interaction with the wearable device when a wireless connection is not established with the mobile device; and the mobile device processor is configured with processor-executable instructions to perform operations further comprising:

listening for a connection attempt by the wearable device while the mobile device is streaming audio data to the wirelessly connected peripheral audio device;

receiving the connection attempt from the wearable device on the mobile device; and establishing the second wireless connection between the mobile device and the wearable device in response to the mobile device receiving the connection attempt from the wearable device.

19. The communication system of claim 18, wherein the mobile device processor is configured with processor-executable instructions to perform operations further comprising:
establishing a third wireless connection between the mobile device and the wearable device;
terminating the third wireless connection between the mobile device and the wearable device;
receiving from the wearable device a second request to establish the second wireless connection; and
establishing a fourth wireless connection between the mobile device and the wearable device in response to receiving the second request to establish the second wireless connection.

20. The communication system of claim 18,
wherein determining whether the mobile device is streaming audio data to the wirelessly connected peripheral audio device comprises determining whether the mobile device is streaming audio data to the wirelessly connected peripheral audio device on a Bluetooth connection;
wherein determining whether the mobile device has stopped streaming audio data to the wirelessly connected peripheral audio device comprises determining whether the mobile device has ended the Bluetooth connection or entered a low duty cycle mode for the Bluetooth connection to the wirelessly connected peripheral audio device; and
wherein sending to the wearable device a request to wirelessly connect to the wearable device in response to determining that the mobile device has stopped streaming audio data to the wirelessly connected peripheral audio device comprises sending a page message to the wearable device on multiple frequencies using a Bluetooth Service Discovery process in response to determining that the mobile device has ended the Bluetooth connection or entered the low duty cycle mode for the Bluetooth connection to the wirelessly connected peripheral audio device.

21. The communication system of claim 17, wherein the mobile device processor is configured with processor-executable instructions to perform operations further comprising:
generating a communication configured to be sent to the wearable device in response to detecting an event on the mobile device; and
determining a type of the request to wirelessly connect to the wearable device.

22. The communication system of claim 21, wherein the mobile device processor is configured with processor-executable instructions to perform the following operations in response to determining that the type of the request to wirelessly connect to the wearable device is a setup type request:
initializing a connection attempt counter;
attempting to wirelessly connect to the wearable device and incrementing the connection attempt counter;
determining whether the attempt to connect to the wearable device succeeded;
sending to the wearable device the generated communication in response to determining that the attempt to connect to the wearable device succeeded;
determining whether the connection attempt counter exceeds a connection attempt threshold in response to determining that the attempt to connect to the wearable device did not succeed;
repeatedly attempting to connect to the wearable device in response to determining that the attempt to connect to the wearable device did not succeed and that the connection attempt counter does not exceed the connection attempt threshold; and
dropping the request to wirelessly connect to the wearable device and storing the generated communication from the mobile device to the wearable device for transmission in a future wireless connection with the wearable device in response to determining that the connection attempt counter exceeds the connection attempt threshold.

23. The communication system of claim 21, wherein the mobile device processor is configured with processor-executable instructions to perform the following operations in response to determining that the type of the request to wirelessly connect to the wearable device is a notification type request:
making a single attempt to wirelessly connect to the wearable device;
determining whether the attempt to connect to the wearable device succeeded;
sending from the mobile device to the wearable device the generated communication in response to determining that the attempt to connect to the wearable device succeeded; and
dropping the request to wirelessly connect to the wearable device and storing the generated communication from the mobile device to the wearable device for a future wireless connection with the wearable device in response to determining that the attempt to connect to the wearable device did not succeed.

24. The communication system of claim 21, wherein the mobile device processor is configured with processor-executable instructions to perform the following operations in response to determining that the type of the request to wirelessly connect to the wearable device is an assorted type request:
initializing a connection attempt timer;
attempting to wirelessly connect to the wearable device;
determining whether the attempt to connect to the wearable device succeeded;
sending from the mobile device to the wearable device the generated communication in response to determining that the attempt to connect to the wearable device succeeded;
determining whether the connection attempt timer exceeds a connection attempt timer threshold in response to determining that the attempt to connect to the wearable device did not succeed;
repeatedly attempting to connect to the wearable device in response to determining that the attempt to connect to the wearable device did not succeed and that the connection attempt timer does not exceed the connection attempt timer threshold; and
dropping the request to wirelessly connect to the wearable device and storing the generated communication to the wearable device for a future wireless connection with the wearable device in response to determining that the connection attempt timer exceeds the connection attempt timer threshold.

* * * * *